United States Patent
Wennström et al.

(10) Patent No.: US 7,817,739 B2
(45) Date of Patent: Oct. 19, 2010

(54) METHOD FOR REDUCING FEEDBACK INFORMATION OVERHEAD IN PRECODED MIMO-OFDM SYSTEMS

(75) Inventors: Mattias Wennström, Uppsala (SE); Jaap Van De Beek, Täby (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 12/341,362

(22) Filed: Dec. 22, 2008

(65) Prior Publication Data

US 2009/0147880 A1    Jun. 11, 2009

Related U.S. Application Data

(63) Continuation of application No. PCT/CN2006/001403, filed on Jun. 20, 2006.

(51) Int. Cl.
*H04K 1/00* (2006.01)
(52) U.S. Cl. .................. 375/260; 375/267; 375/299; 375/347
(58) Field of Classification Search .............. 375/260, 375/267, 299, 347
See application file for complete search history.

(56) References Cited

U.S. PATENT DOCUMENTS

2005/0095996 A1    5/2005 Takano
2005/0157808 A1    7/2005 Ihm et al.
2006/0071807 A1    4/2006 Sadowsky
2006/0093065 A1    5/2006 Thomas et al.
2006/0109923 A1 *  5/2006 Cai et al. ............. 375/260

FOREIGN PATENT DOCUMENTS

CN        1614906 A        5/2005
WO    WO 2007/109917 A1   10/2007

OTHER PUBLICATIONS

Huawei, "Unified Uplink CQI Signaling by Efficient Labeling,"3GPP (*Technical Specification Group RAN WG1 Meeting 45*), R1-061246:1-7 (May 2006).
Zhang et al., A Tracking Approach for Precoded MIMO-OFDM Systems with Low Data Rate CSI Feedback, *IEEE International Symposium on Personal Indoor and Mobile Radio Communications*, 1:241-245 (Sep. 2005).

(Continued)

*Primary Examiner*—Kevin Y Kim
(74) *Attorney, Agent, or Firm*—Leydig, Voit & Mayer, Ltd.

(57) ABSTRACT

An improved method for reducing an amount of precoding feedback information in a multi-carrier Multiple-Input Multiple-Output (MIMO) communication system using precoding is disclosed. At the receiving end, the method jointly selects, while considering transmission quality for each relevant combination of sub-bands and matrices, a limited number of P codebook indices and a limited number of K' sub-bands to be included in a subset $\omega$ $(m_1, \ldots, m_{K'})$ of a set $\Omega$ of allowed sub-bands. K' is here set to a value $K' < K$ and P is set to a value $P \leq K'$. The P codebook indices and information identifying the subset $\omega$ is then conveyed to the transmitting end.

26 Claims, 4 Drawing Sheets

OTHER PUBLICATIONS

Huawei, "Downlink Adaptation/Scheduling Guided by an Efficient CQI-Feedback Scheme," 3GPP (*Technical Specification Group RAN WG1 Meeting 44 bis*), R1-060821:1-5 (Mar. 2006).

European Search Report (Jan. 20, 2010).

State Intellectual Property Office of the People's Republic of China, Examination Report in Chinese Patent Application No. 200680024209.5 (Mar. 20, 2009).

Texas Instruments, "Feedback Reduction for Rank-1 Pre-coding for E-UTRA Downlink," 3GPP TSG RAN WG1 #45, R1-061441 (May 2006).

Texas Instruments, "Evaluation of Codebook-Based Preceding for LTE MIMO Systems," 3GPP TSG RAN WG1 #45, R1-061439 (May 2006).

Ericsson, "System-Level Evaluation of OFDM—Further Considerations," 3GPP (Technical Specification Group (TSG-RAN WG1 #35), R1-031303 (Nov. 2003).

Choi et al., "Interpolation Based Transmit Beamforming for MIMO-OFDM with Limited Feedback," IEEE Transactions on Signal Processing, vol. 53, No. 11, pp. 4125-4135 (Nov. 2005).

Choi et al., "Interpolation Based Unitary Preceding for Spatial Multiplexing MIMO-OFDM with Limited Feedback," IEEE Communications Society, Globecom 2004, pp. 214-218 (2004).

Mondal et al., "Algorithms for Quantized Preceding in MIMO OFDM Beamforming Systems," Wireless Networking and Communications Group, The University of Texas at Austin, 5847-12 V.1, p. 1-8 (Feb. 28, 2005).

Communication Under Rule 71(3) EPC Regarding Grant of European Patent Application No. 06 742 199.0, Sep. 2009.

European Patent Application No. 06 742 199.0 as allowed by the European Patent Office, Aug. 2009.

* cited by examiner

METHOD FOR REDUCING FEEDBACK INFORMATION OVERHEAD IN PRECODED MIMO-OFDM SYSTEMS

CROSS-REFERENCE TO RELATED APPLICATIONS

This application is a continuation of International Application No. PCT/CN2006/001403, filed on Jun. 20, 2006, which is hereby incorporated by reference in its entirety.

FIELD OF THE INVENTION

The present invention relates to the filed of communication technologies, and in particular to a method, a receiving unit and a transmitting unit for reducing the amount of precoding feedback information at a receiving and/or a transmitting end of a communication system.

BACKGROUND

In wireless communication systems utilizing multiple antennas at both transmitter and receiver, commonly known as Multiple-Input Multiple-Output (MIMO) systems, it is well known in background art that the performance is greatly enhanced if linear MIMO precoding can be used at the transmitter side. Such linear precoding has been implemented in the IEEE 802.16-2005 Standard and is also suggested for 3GPP E-UTRA.

Orthogonal Frequency Division Multiplexing (OFDM) combined with MIMO enables an extension of the MIMO precoding to frequency selective MIMO channels. In MIMO-OFDM, a broadband channel is converted into multiple narrowband channels corresponding to OFDM subcarriers. Each narrowband channel can be assumed to be flat fading.

Furthermore, equal size groups of adjacent OFDM subcarriers are formed to obtain OFDM sub-bands. A common value, used in 3GPP E-UTRA, is 25 adjacent OFDM subcarriers which form an OFDM sub-band. Hence, the total bandwidth is divided into K sub-bands. The width of each sub-band is chosen so that the channel is approximately flat fading within each sub-band. This implies that the same best precoding matrix is approximately valid for all subcarriers within a sub-band.

A problem arising in MIMO-OFDM is that due to frequency selective scheduling, the feedback overhead increases since the channel quality becomes a function of a number of OFDM sub-bands. In addition, when codebook based linear MIMO preceding is applied, the receiver needs to indicate the precoding matrix index (PMI) to the codebook for each OFDM sub-band as well. This means that the signaling overhead burden becomes significant and methods must be found to reduce this overhead.

For codebook based precoded MIMO-OFDM, some background arts exist, which all exploit the correlation of optimal preceding matrices on adjacent subcarriers or sub-bands to reduce the feedback of precoding information.

At the end of this specification, a number of background art documents are listed.

In document [6] "3GPP R1-061441, *Feedback Reduction for Rank-1 Pre-coding for E-UTRA Downlink*, Texas Instruments, Shanghai, May 2006" and document [7] "3GPP R1-061439, *Evaluation of Codebook-based Precoding for LTE MIMO Systems*, Texas Instruments, Shanghai, May 2006", a grouping approach is described where the feedback of precoding information is reduced by creating larger groups of adjacent subcarriers and finding a precoding matrix which is valid on average for this larger group. For instance, it is recommended in document [6] that a precoding matrix index for every second OFDM sub-band is sufficient with only a small degradation in performance compared to feeding back a precoding matrix index for every OFDM sub-band. In this way the feedback overhead for the precoding matrix is halved.

The same basic approach is taken in document [3] "J. Choi, R. W. Heath Jr., *Interpolation Based Unitary Precoding for Spatial Multiplexing MIMO-OFDM with Limited Feedback*, IEEE Globecom Conference 2004, Dallas, USA, November 2004, page 214-218)" and document [4] "(J. Choi, R. W. Heath Jr., *Interpolation Based Transmit Beamforming for MIMO-OFDM with Limited Feedback*, IEEE Transactions on Signal Processing, Vol. 53, No. 11, November 2005, page 4125-4135". The authors here suggest reporting precoding matrix indices for every L:th OFDM subcarrier, uniformly sampled over the whole bandwidth. In the transmitter, a reconstruction of the intermediate precoding matrix indices is performed using interpolation.

In document [5] "B. Mondahl, R. W. Heath Jr., Algorithms for Quantized Precoding in MIMO-OFDM Beamforming Systems, Proceedings of the SPIE, Volume 5847, pp. 80-87, 2005", an alternative approach is suggested, where the channel information (precoding matrix information) is quantized in the time domain, instead of the frequency domain, where the transform decorrelates the channel information. The idea is to decorrelate the precoding matrix information before quantization. The performance of this method is shown to be similar to the grouping proposal in document [4].

The background art precoding matrix index feedback signaling reduction methods all have the disadvantage that they often feed back information that is not used at a transmitting end of the system. The background art solutions for reducing the precoding matrix index feedback overhead do not take into consideration that some information is more valuable than other information at the transmitting end.

There is thus a need for a method that intelligently chooses which information to feed back so as to further reduce the amount of precoding matrix index feedback signaling overhead.

SUMMARY

It is an object of the present invention to provide methods, a receiving unit and a transmitting unit for reducing the amount of precoding feedback information at the receiving and transmitting ends of a communication system.

In particular, it is an object of present invention to provide methods, a receiving unit and a transmitting unit that reduce the amount of matrix index feedback signaling more than the methods in the prior art.

It is also an object of present invention to provide methods, a receiving unit and a transmitting unit that limit the matrix index feedback signaling to information that will be useful in the system.

These objects are achieved by precoding feedback information reducing methods according to the characterizing portions of claims 1 and 19.

These objects are also achieved by precoding feedback information reducing receiving and transmitting units according to the characterizing portions of claims 20 and 22.

The methods, receiving unit, and transmitting unit according to the invention make it possible, at the receiving end, to effectively decide that which information will be needed at the transmitting end and then feed back this information.

This is achieved by the methods, the receiving unit, and the transmitting unit according to the invention since they do not waste communication resources on signaling information regarding sub-bands having poor quality.

Because of this, the methods, the receiving unit, and the transmitting unit according to the invention limit the fed back information to only include information regarding sub-bands that are probable for being scheduled for transmission. The amount of feedback information can thereby be reduced.

The invention presents a solution having a good tradeoff between throughput and feedback reduction.

In an embodiment of the present invention, rank adaptation can be performed, i.e. a number of streams can also be selected jointly with a subset and a vector of precoding codebook indices. This can be advantageous for maximizing throughput of a connection.

In an embodiment of the present invention, the number of elements in a precoding codebook indices vector can be set to a very low value, for instance the value one. This is a very effective alternative for reducing the feedback signaling. This embodiment is also advantageous for situations where the performance of the precoding matrices is highly correlated over the OFDM sub-bands.

In an embodiment of the present invention, a precoding matrix index can be fed back for a complementary subset consisting of the sub-bands not selected by the method. As an alternative, the precoding matrix used for the complementary subset may be fixed. This has the advantage that very little information has to be fed back if the scheduler decides to schedule a sub-band within the complementary subset for transmission.

In an embodiment of the present invention, a bitmap is used for identifying selected subsets. The bitmap representation is an efficient compression method that further reduces the amount of transmitted feedback information.

Detailed exemplary embodiments and advantages of the methods, receiving unit, and transmitting unit for reducing the amount of matrix index feedback signaling according to the present invention will now be described with reference to the appended drawings illustrating some preferred embodiments.

DETAILED DESCRIPTION

Figure 1:
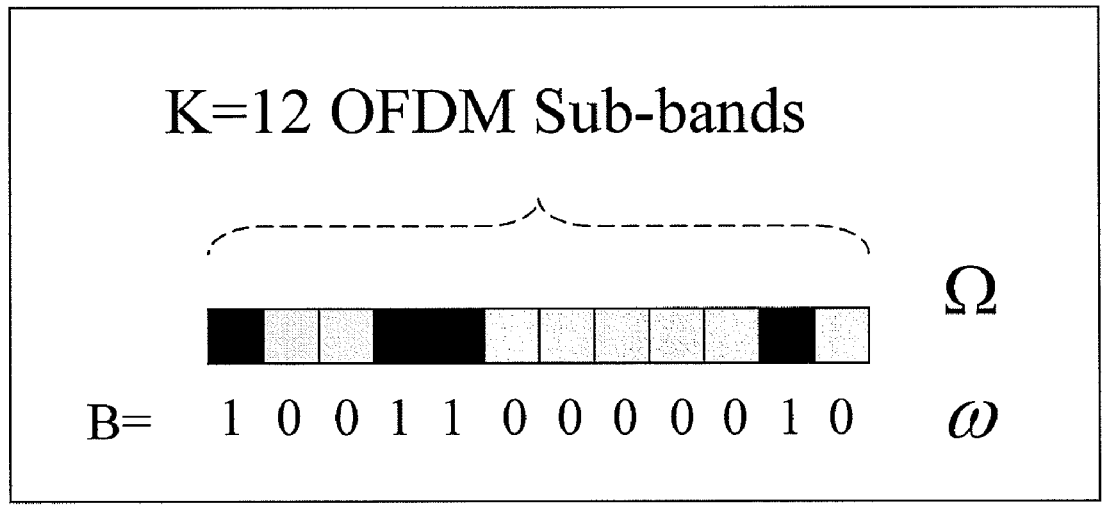
FIG. 1 shows selection of a subset X from a set of all available sub-bands $\Omega$ and identifying the subset $\omega$ using a bitmap B.

In a flat fading, non-precoded MIMO system with $N_T$ transmitter antennas and $N_R$ receiver antennas, the input-output relationship can be described as $$y=Hx+n. \qquad (1)$$

In equation (1), x is the $N_T \times 1$ vector of transmitted symbols, y,n are the $N_R \times 1$ vectors of received symbols and noise respectively and H is the $N_R \times N_T$ matrix of channel coefficients. The transmitter symbols are thus $N_T$-fold spatially multiplexed over the MIMO channel H or in other words, $N_T$ streams are transmitted in parallel, leading to a theoretically $N_T$-fold increase in spectral efficiency.

Linear precoding implies that a $N_T \times N_S$ precoding matrix W is introduced in (1) to precode the symbols in the vector x. The column dimension $N_S$ can be selected to be smaller than $N_T$ in which case x is modified to dimension $N_S \times 1$. Hence, $N_S$ streams are transmitted in parallel, which is known as rank adaptation and implies that fewer symbols are spatially multiplexed over the channel. Rank adaptation is useful since the symbol error probability is decreased, although fewer symbols are spatially multiplexed. The input-output relation for precoded MIMO is thus described as $$y=HWx+n \qquad (2)$$

To select the best precoder matrix W in (2), knowledge about the channel H and the receiver noise statistics is necessary. Therefore, the selection is preferably made in the receiver since this information is readily available there. The selected precoder W is then signaled to the transmitter, which implements the precoding according to the receiver preference. To reduce the signaling burden between the receiver and the transmitter, it is commonly assumed that the precoding matrix W belongs to a fixed set of precoding matrices, known as the precoding codebook. If the codebook has N elements, $\overline{N}=\lceil \log_2(N) \rceil$ bits are needed to indicate an element in the codebook and thus only the precoding matrix index (PMI) needs to be signaled from the receiver to the transmitter.

Orthogonal Frequency Division Multiplexing (OFDM) combined with MIMO enables an extension of the MIMO precoding to frequency selective MIMO channels. In MIMO-OFDM, a broadband channels is converted into multiple narrowband channels corresponding to OFDM subcarriers. Each narrowband channel can assumed to be flat fading. Using OFDM, equations (1) and (2) are thus valid for each such narrowband channel.

Furthermore, equal size groups of adjacent OFDM subcarriers are formed to obtain OFDM sub-bands. A common value, used in 3GPP E-UTRA, is 25 adjacent OFDM subcarriers which form an OFDM sub-band. Hence, the total bandwidth is divided into K sub-bands. The width of each sub-band is chosen so that the channel is approximately flat fading within each sub-band. This implies that the same best precoding matrix W in (2) is approximately valid for all subcarriers within a sub-band. Hence, the minimum necessary granularity in the PMI feedback is one sub-band and it is only necessary to feed back one PMI per sub-band.

In OFDM systems, frequency selective scheduling is performed. Since the channel quality, such as signal to interference ratio, varies over the transmission bandwidth, frequency selective scheduling and multi-user scheduling are applied, e.g. in systems such as E-UTRA and IEEE 802.16.

To realize frequency selective scheduling, a receiver indicates, on a feedback channel, which Q sub-bands in the K OFDM sub-bands are more applicable to receive data, and also indicates the quality indicators for these Q sub-bands. A natural choice for the receiver is to indicate the Q sub-bands which have the highest signal to interference ratio among the K OFDM sub-bands. This is shown in background art document [1] "3GPP R1-061246, *Unified uplink CQI signalling by efficient labeling*, Huawei, Shanghai, May 2006".

Background art document [2] "PCT/CN/2006/0004, *Method for sub-band indicator signaling*, Huawei, Patent application, March 2006" further shows an efficient method to signal the subset of Q sub-bands out of K available sub-bands.

In the present invention, an approach is taken which combines the physical layer behavior of precoding with the actions of the scheduling layer. Hence, a cross-layer approach is taken.

The inventors of the present invention have made an observation that a user will not be scheduled on its OFDM sub-bands where its channel quality is poor due to, e.g., competition from other users.

The inventors of the present invention have further discovered that precoding matrix indices for the OFDM sub-bands with the highest channel qualities are correlated. This means that a precoding matrix that works well for one sub-band having high quality is likely to also work well for another sub-band having high quality. The inventors have then realized that this discovery could be used for reducing the number of precoding matrices used.

Therefore, there is no gain in feeding back precoding matrix information for all OFDM sub-bands, since this information will not be used by the transmitter, unless all sub-bands are scheduled to the user in which case no frequency scheduling gain is obtained.

Hence, the present invention differs from background art documents [3], [4], [5], [6] and [7] in that no attempt to fully describe the precoding matrix index for the whole bandwidth is made. Instead, the invention describes only the precoding matrix indices for those OFDM sub-bands where transmission is likely to take place due to high channel quality.

The bands the receiver desires to be scheduled on could efficiently be signaled using the labeling technique of document [1], and the precoding matrix indicator signaling could preferably coincide with the signaling of the channel quality information.

The OFDM bandwidth can be divided into sub-bands of equal frequency bandwidth among which K are allowed and available for scheduling. This set of K sub-bands is denoted $\Omega$. A receiver decides to generate a precoding matrix index report for a smaller subset $\omega$ consisting of K' out of the total K sub-bands in $\Omega$.

A label that uniquely defines the set $\omega$ may be generated using a bitmap B. This is shown in FIG. 1, wherein the bandwidth is divided into K (K=12) frequency sub-bands. K' (K'=4) sub-bands are selected and may be labeled by the bitmap mask B. An efficient bitmap compression method may also be used, see documents [1] and [2].

Figure 2:
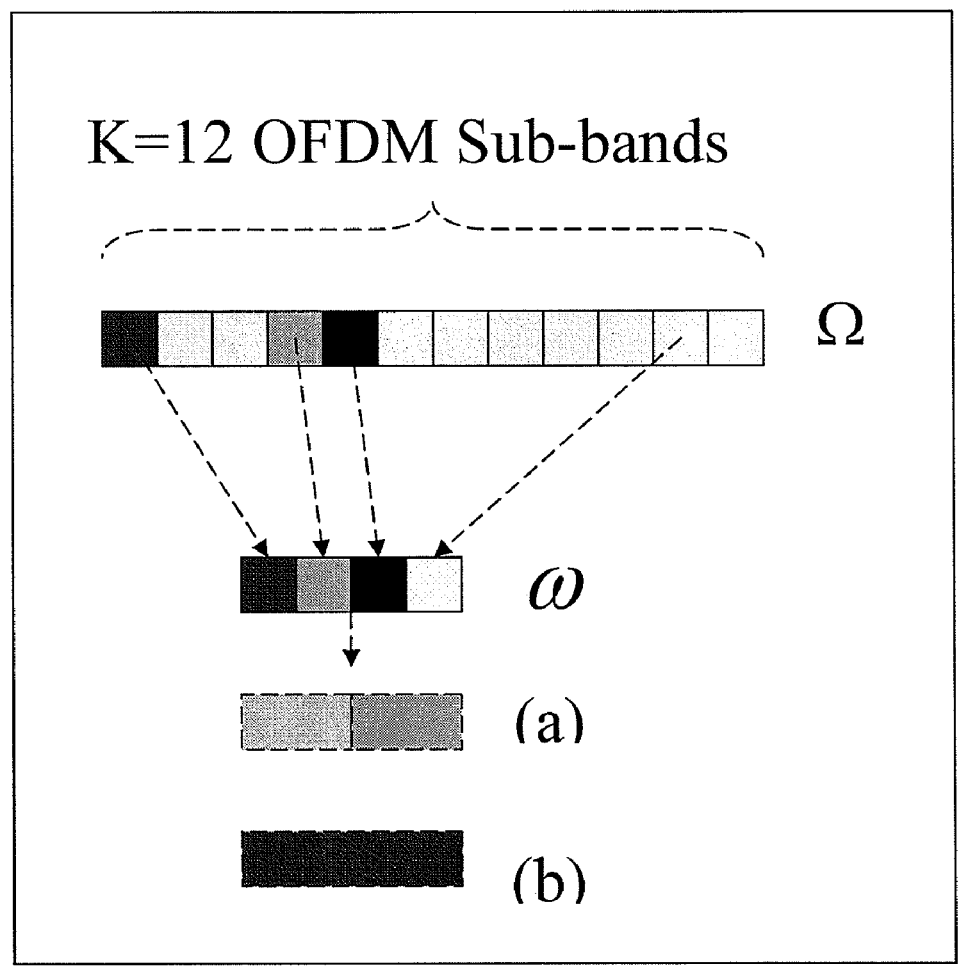
FIG. 2 shows selection of a subset $\omega$ from a set of all available sub-bands $\Omega$ and then, in (a) and (b) using grouping approaches for the subset $\omega$.

The precoding matrix index report can now be generated for the subset $\omega$ of OFDM sub-bands. This is shown in FIG. 2, wherein an efficient compression of precoding information using the subset $\omega$ of K' (K'=4) sub-bands is performed. The precoding matrix information in $\omega$ can be further compressed by using for example a grouping approach (a) or a single precoding matrix index for the whole subset $\omega$ as shown in example (b).

According to the present invention, for selection of the subset $\omega$ of K' sub-bands an optimization criterion is used $$\{\Pi, \omega\} = \arg\max_{\hat{\Pi}, \hat{\omega}} f(\hat{\Pi}, \hat{\omega}, N_S) \quad (3)$$

where $\Pi$ is a vector containing the precoding matrix indices for the corresponding sub-bands in the vector $\omega$, which elements are selected from $\Omega$, constituting the full set of allowed frequency sub-bands. Furthermore, $N_S$ is the rank of the transmission, i.e. the number of transmitted streams. The function $f$ is a scalar metric that maps multiple stream and multiple sub-band measures into a single real number.

In an embodiment of the present invention, the K' best bands are found, which maximize the metric $f$ as in equation (3), where each band is using its best preceding matrix index and where K' is a given number. In this embodiment, $\Pi$ contains a number of elements P that can be up to the number of selected sub-bands K'. There can thus in this embodiment different precoding matrix indices be chosen for every one of the K' sub-bands selected for $\omega$. Up to P (P=K') precoding matrix indices and a set of K' sub-bands in the vector $\omega$ are jointly found which solves equation (3) in this embodiment.

In an alternative embodiment, to further reduce the feedback, the vector $\Pi$ of preceding matrix indices is chosen to have fewer elements than the corresponding sub-band vector $\omega$. An example is to group the sub-bands in the vector $\omega$ and report one precoding matrix index for each group of sub-bands. Hence a grouping method similar to the one in background art document [6] is used although here the grouping is performed on the selected sub-bands $\omega$ and not on the whole set of sub-bands $\Omega$. In this embodiment, $\Pi$ contains a number of elements P that is less than the number of selected sub-bands K'. Up to a number P<K' precoding matrix indices and a set of K' sub-bands in the vector $\omega$ are jointly found which solve equation (3) in this embodiment. See example (a) in FIG. 2, where P is set to two, i.e., P=2.

In an alternative embodiment of the present invention, the vector $\Pi$ of precoding matrix indices has a single element. In this embodiment, $\Pi$ contains a number of elements P being equal to one. Hence, a single precoding matrix index and a set of K' sub-bands in the vector $\omega$ are jointly found which solves equation (3). See example (b) in FIG. 2.

Figure 3:
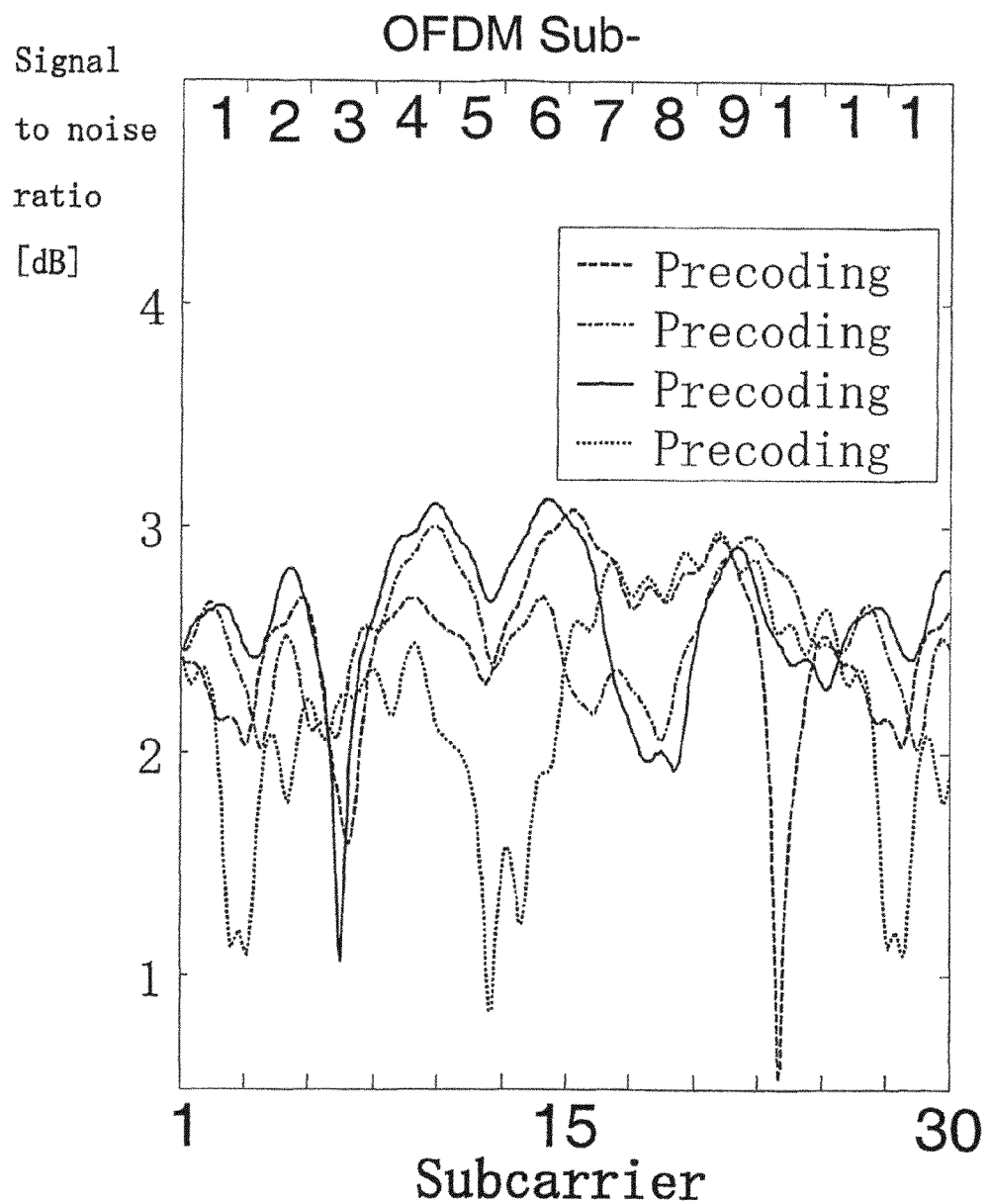
FIG. 3 shows an example of an SNR plot for precoding matrices and sub-bands in the OFDM sub-band spectrum.

FIG. 3 shows an example of a Signal to Noise Ratio (SNR) plot for precoding matrices and sub-bands in the OFDM sub-band spectrum. The plot in FIG. 3 will hereafter be used for illustrating how combinations of precoding matrix index and sub-bands can be jointly selected according to the present invention.

In a first example according to the invention with reference to FIG. 3, the number of elements P in $\Pi$ is set to one, i.e., P=1, and the number of sub-bands to be selected K' is set to four, i.e., K'=4. The method according to the present invention then searches through all possible combinations of indices and sub-bands, in this particular case searches for the one matrix that gives best transmission quality when being used for four sub-bands, and for which set of four sub-bands this matrix is to be used. Here matrix 3 and sub-bands 4, 5, 6 and 12 are selected.

In a second example according to the present invention with reference to FIG. 3, P and K' are set to, i.e., P=2 and K'=4. The selection in this example differs from the selection in the previous example in that sub-band 7 and matrix 1 will be chosen instead of sub-band 12. This is appropriate since two matrix indices can be selected and matrix 1 has higher SNR in sub-band 7 than matrix 3 has in sub-band 12.

Background art methods for reducing precoding matrix index signaling have had solutions that send precoding matrix indices for a fixed subset of sub-bands, for example every second sub-band. This could have the effect that a lot of the precoding matrix index signaling is made for sub-bands having such a bad quality that they should not be scheduled by the scheduler. The background art methods are therefore suboptimal.

In the example in FIG. 3, if a background art method using every second sub-band could, for example, using a fixed subset of sub-bands 1, 3, 5, 7, 9, and 11, the background art method would then have chosen the best possible precoding matrix for each of these sub-bands and would have conveyed precoding matrix index signaling for the precoding matrixes found in each sub-band. Sub-bands 1, 3 and 11 have, as can be seen in FIG. 3, very bad SNR for all matrixes, especially sub-band 3, and would probably not be scheduled anyway. The signaling regarding these sub-bands in the background art solutions would therefore be a waste of communications resources.

When precoding matrix indices and a set of K' sub-bands are selected according to the present invention, that is by using equation (3) for jointly finding precoding matrix indices and a set of K' sub-bands given the number of available precoding matrix indices and the number K', the best possible combinations of sub-bands and precoding matrix indices to use on these sub-bands are selected.

This equation (3) goes through all possible combinations of available sub-bands and precoding matrix indices and selects the combinations that maximize function $f$. Function $f$ gives a measure of transmission quality. Equation (3) thus selects the combinations that result in the highest possible transmission qualities. Equation (3) therefore also selects combinations that are probable to be scheduled by a scheduler. Function $f$ will be further described below.

Figure 4:
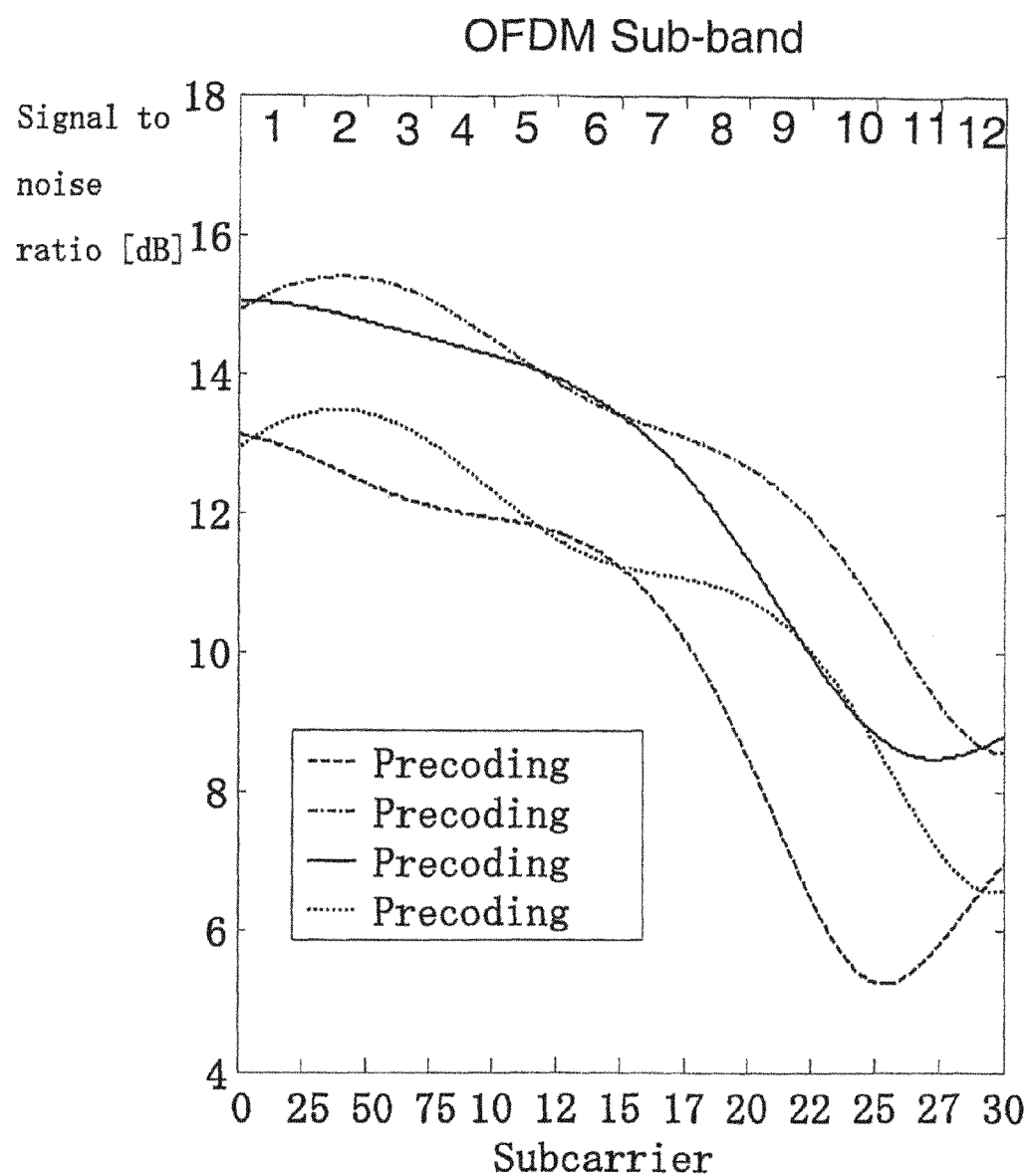
FIG. 4 shows another example of an SNR plot for precoding matrices and sub-bands in the OFDM sub-band spectrum.

FIG. 4 shows another SNR (Signal to Noise Ratio) plot for precoding matrices and sub-bands in the OFDM sub-band spectrum. As can be seen in FIG. 4, sometimes some of the precoding matrices are generally better than the others. In a situation like this, the embodiment of the present invention in which the vector Π of precoding matrix indices has a single element, P=1, can be especially advantageous. Since one particular precoding matrix is the best matrix over more or less the whole bandwidth, the method according to the present invention, where P=1, is then more or less simplified to a choice of sub-bands.

The selection of sub-bands and precoding matrices can also be extended to rank adaptation, where the rank, i.e. the number of streams $N_S$ is selected as $$\{\Pi, \omega, N_S\} = \arg\max_{\hat{\Pi}, \hat{\omega}, \hat{N}_S} f(\hat{\Pi}, \hat{\omega}, \hat{N}_S) \quad (4)$$

When equation (4) is used, precoding matrix indices, a set of K' sub-bands in the vector ω and number of streams Ns are jointly found which solve equation (4). This can, in the same way as for equation (3), be done for different numbers P of elements in Π. When equation (4) is used, rank adaptation decisions are made in the receiving end. This can be advantageous regarding the possibilities of maximizing throughput for a connection. When equation (3) is used, Ns is set at the BTS/Node B.

The metric function $f$ in equations (3) and (4) above is a function of the sub-bands in the vector ω, its corresponding length K' and the precoding matrix index/indices in Π. It can be implemented in various ways. One embodiment is to use the effective exponential SIR mapping (EESM) in document "[8] (3GPP R1-031304, *System-level evaluation of OFDM—initial evaluation*, Ericsson, Nov. 17-21, 2003)" for each stream, assuming a certain set of sub-bands ω and a vector of PMI or a single PMI used for all sub-bands in ω, and then use the following expression for f:

$$f(\Pi,\omega,N_S)=\min(EESM_1(\Pi,\omega,N_S),\Lambda,EESM_{N_S}(\Pi,\omega,N_S)) \quad (5)$$

where $N_S$ is the number of streams and $EESM_s(\Pi,\omega,N_S)$ is the EESM for stream s assuming $N_S$ streams and the use of precoder matrices with indices in the vector Π and the sub-bands ω. The EESM is also a function of the channel matrix H and covariance matrix of the interference, but it has been omitted in the notation in here for clarity.

Another alternative is to map the EESM to mutual information for each stream assuming a certain set of sub-bands ω and a vector of PMI, or a single PMI, and then sum the throughputs or mutual information for each stream and sub-band to obtain the scalar output of the of the metric function $f$ as $$f(\Pi, \omega, N_S) = \sum_{s=1}^{N_S} \log_2(1 + EESM_s(\Pi, \omega, N_S)) \quad (6)$$

Another alternative is to consider f to reflect the expected sum throughput at a given block error rate (BLER)

$$f(\Pi, \omega, N_S) = \sum_{s=1}^{N_S} g_{BLER}(EESM_s(\Pi, \omega, N_S)) \quad (7)$$

Where $g_{BLER}(x)$ is a function which maps EESM values to a corresponding largest possible code block size (number of information bits) which gives BLER less than a prescribed desired value. Hence, equation (7) gives the sum of the code block sizes for each stream and this number is proportional to the expected throughput.

The approaches in equations (5), (6) and (7) assume multiple code words, where each stream transmits a separately encoded block of information. Another alternative is to use a single (larger) codeword, which is interleaved and mapped over all streams, in which case as single EESM value is obtained for the whole codeword $$f(\Pi,\omega,N_S)=EESM_{1,\ldots,N_S}(\Pi,\omega,N_S) \quad (8)$$

As is understood by a person skilled in the art, this metric function $f$ can be calculated in a number of ways. There are a number of different definitions for transmission quality and also a number of different ways to estimate transmission quality. Equations (5) and (8) give an SNR measure, equation (6) gives a capacity measure and equation (7) gives a measure of realistic throughput. These are all different measures of transmission quality, but there are also a number of other measures of transmission quality known in the field of communications. Equations (5)-(8) above are thus to be seen as four examples out of a number of possible ways to perform this estimation. The scope of the present invention is not limited to equations (5)-(8) above.

In an embodiment, the receiver can feed back a precoding matrix index for the complementary set $\bar{\omega}$ of sub-bands in addition to the precoding matrix index/indices for the subset ω, where $\bar{\omega} Y \omega = \Omega$. If the scheduler decides to transmit using sub-bands in the subset $\bar{\omega}$ it can utilize the precoding matrix index for the complementary set of sub-bands.

Alternatively, the precoding matrix for the sub-bands in $\bar{\omega}$ could be fixed. Then no signaling is required for precoding matrix indication of these sub-bands. Specifically, the fixed precoding matrix in this case could be the identity matrix, or if the precoding matrix is not square, it could be selected columns from an identity matrix.

In all the above described embodiments the compression of precoding matrix index information in the subset ω can be made with arbitrary compression method, such as average run-length coding or any other compression method known in the art.

The sub-bands in ω can also be further divided into multiple sub-sub-bands where each sub-sub-band has a certain unique precoding matrix index. The latter approach also requires a label to point out how the division of ω into sub-sub-bands is made.

In an embodiment, the transmitting end is a BTS/Node B and the receiving end is a mobile station/UE. In this embodiment, the mobile station/UE conveys precoding vector Π, subset ω and possibly number of streams Ns to the BTS/Node B. BTS/Node B here regards this conveyed information as a recommendation, but do not have to follow this recommendation strictly. In this embodiment K' may be set by the BTS/Node B, and may also be set by the mobile station/UE.

In an embodiment, the transmitting end is a mobile station/UE and the receiving end is a BTS/node B. In this embodiment, BTS/node B conveys a scheduling grant containing precoding vector Π, subset ω and possibly number of streams Ns to the mobile station/UE. Mobile station/UE here strictly has to follow the conveyed information.

In an embodiment, the number of elements P in Π is set in the system standard and the value of P can possibly be set based on varying kinds of data, such as system bandwidth, communication statistics or the like.

Figure 5:
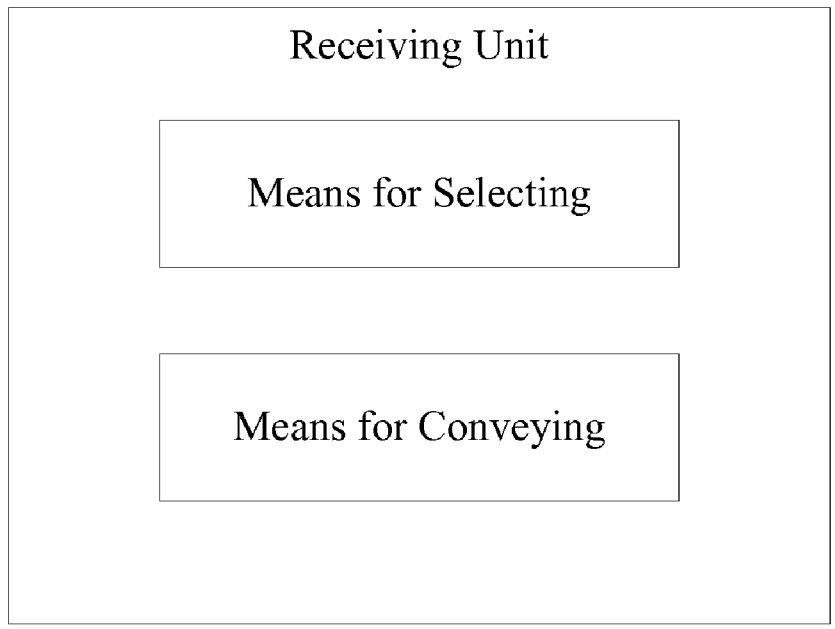
FIG. 5 shows an example of a receiving unit.
Figure 6:
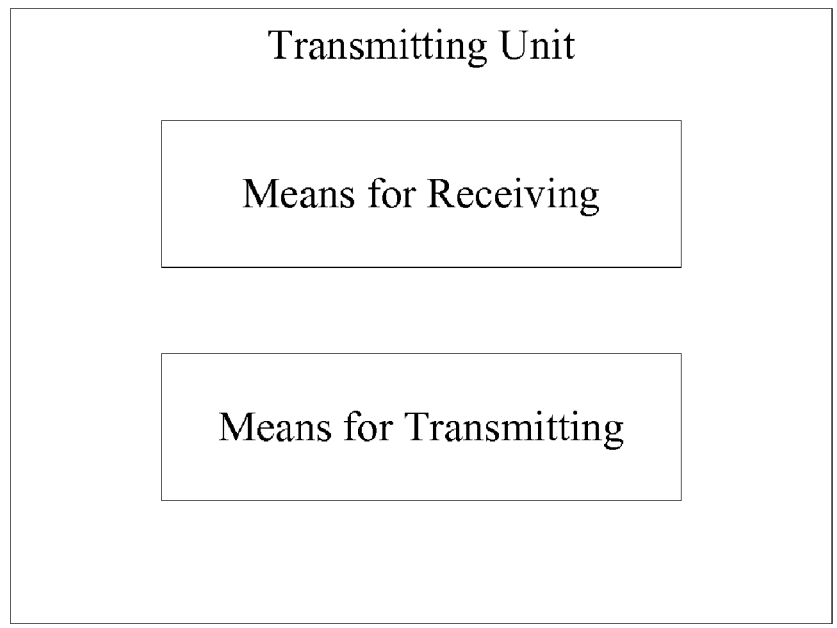
FIG. 6 shows an example of a transmitting unit.
Figure 1:
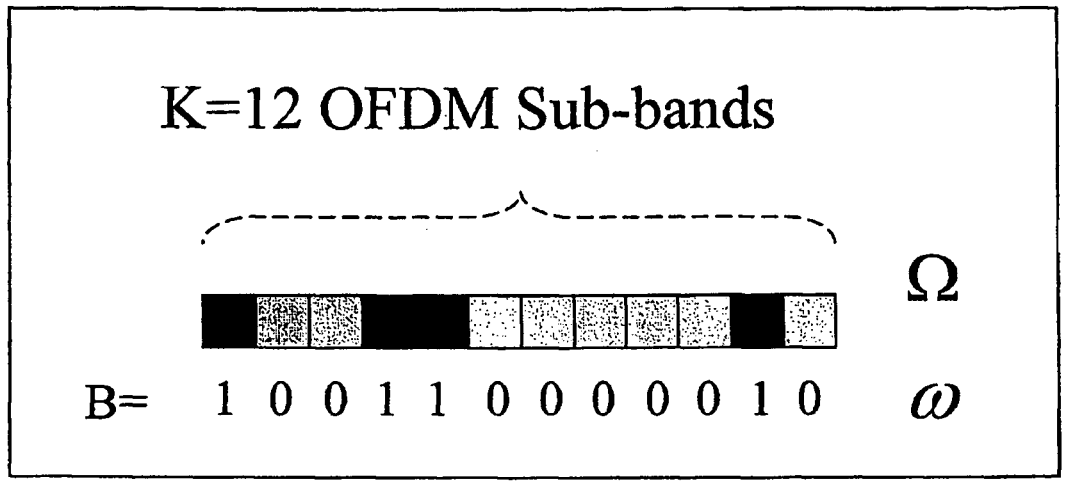
Figure 2:
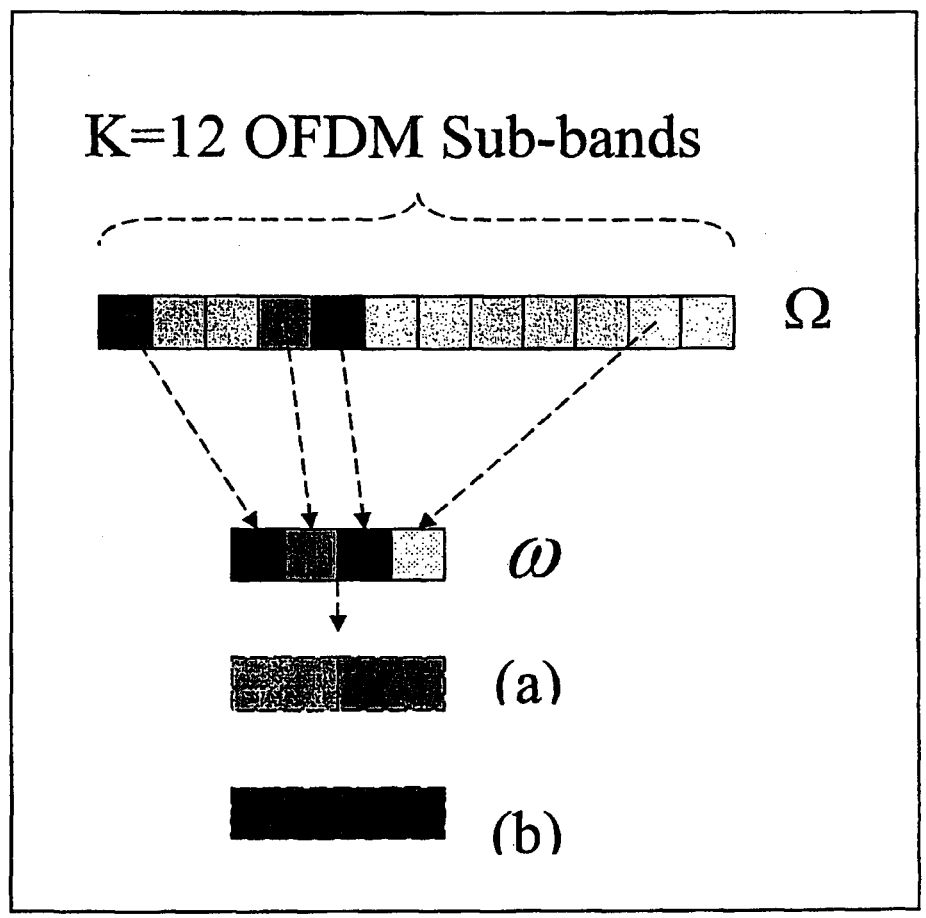
Figure 3:
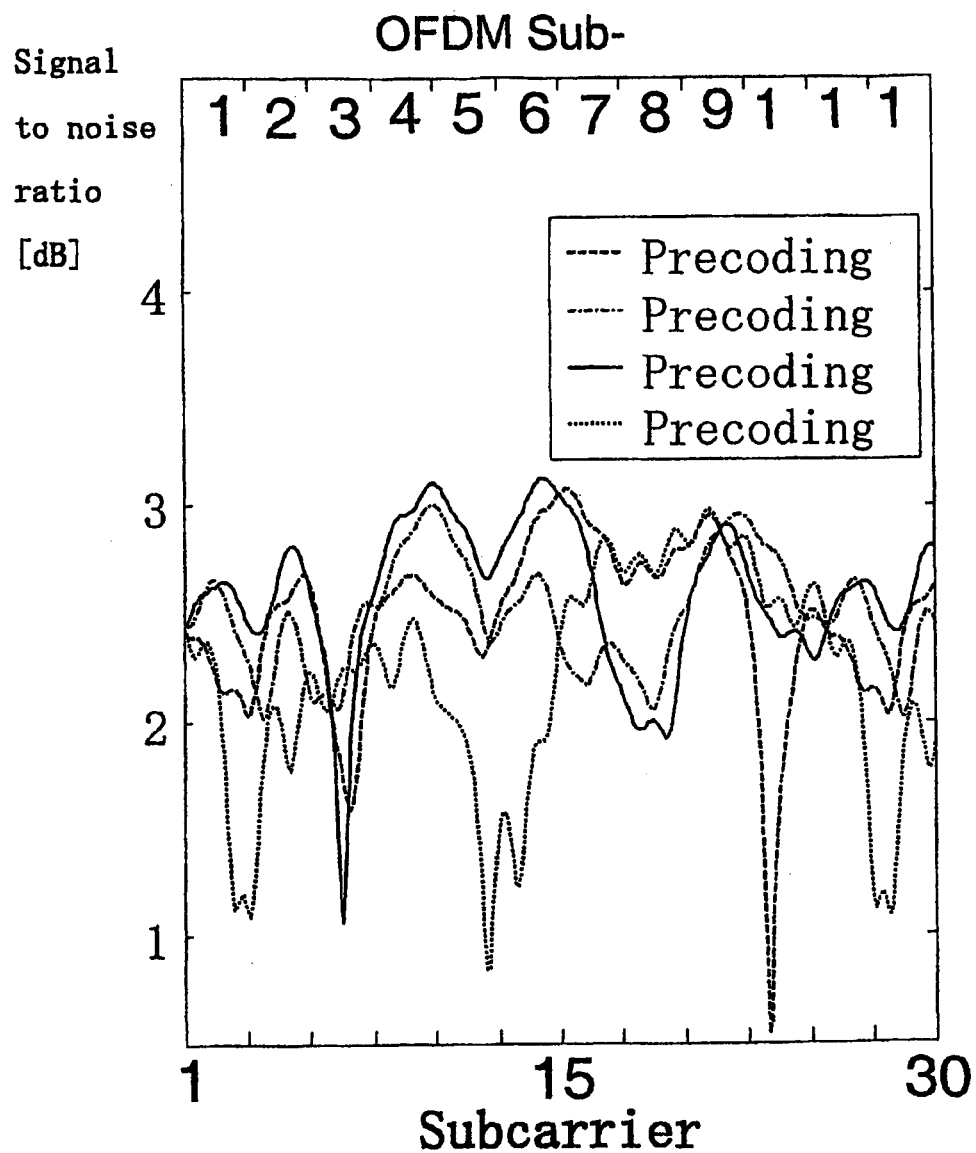
Figure 4:
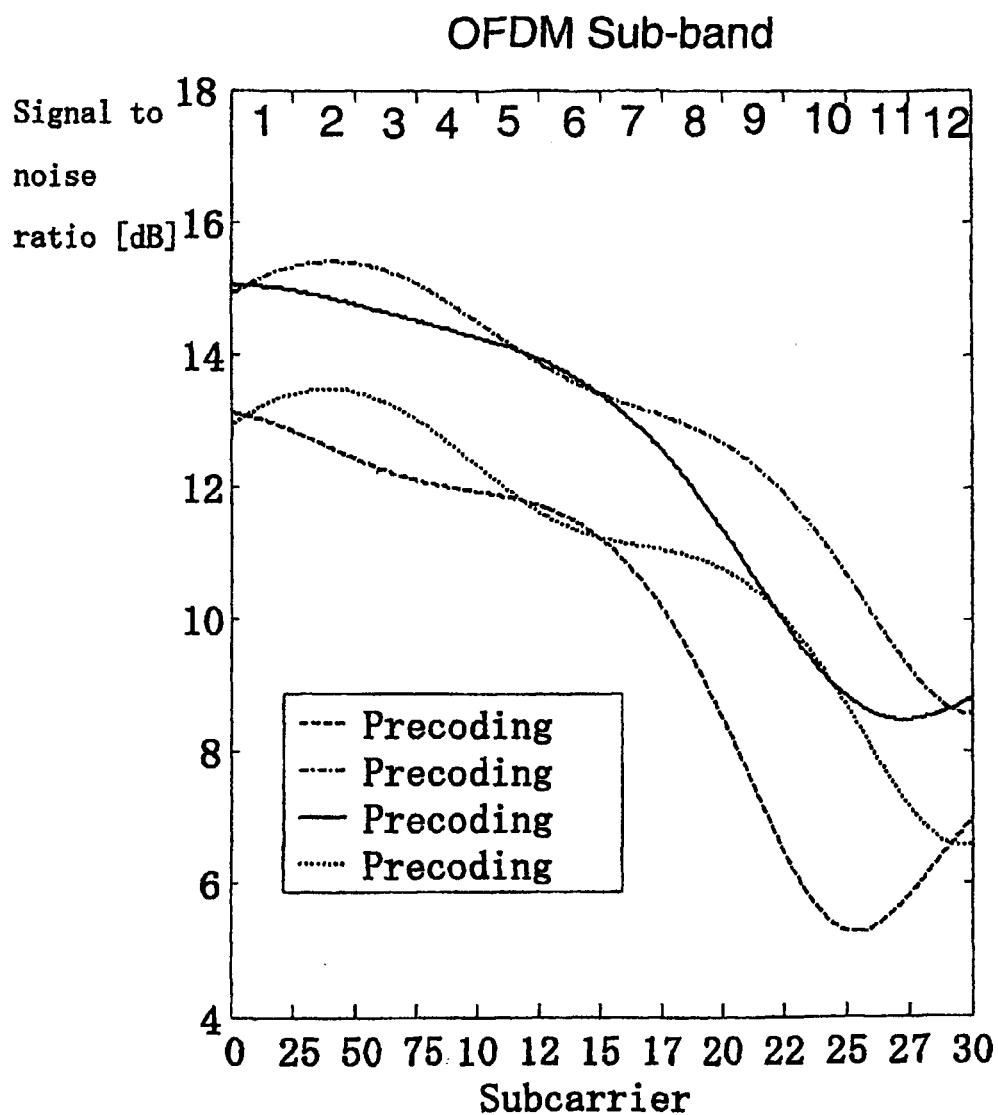
Figure 5:
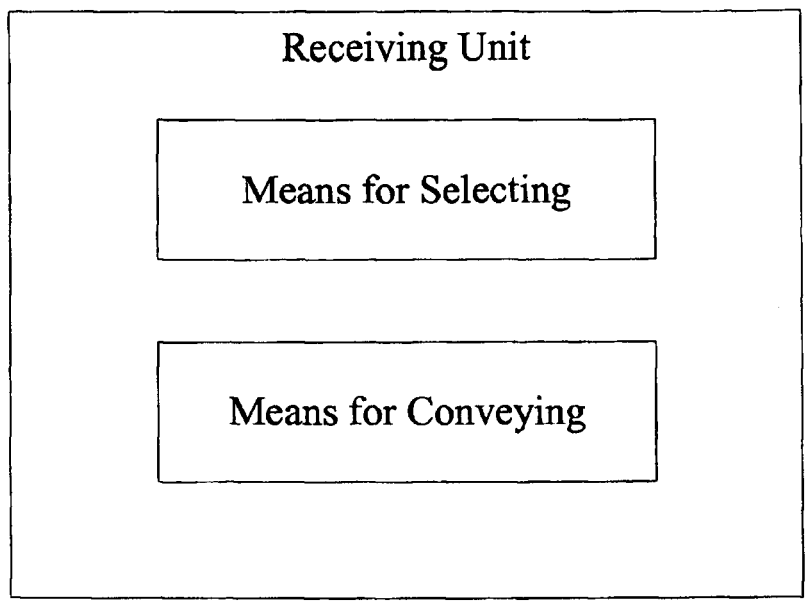
Figure 6:
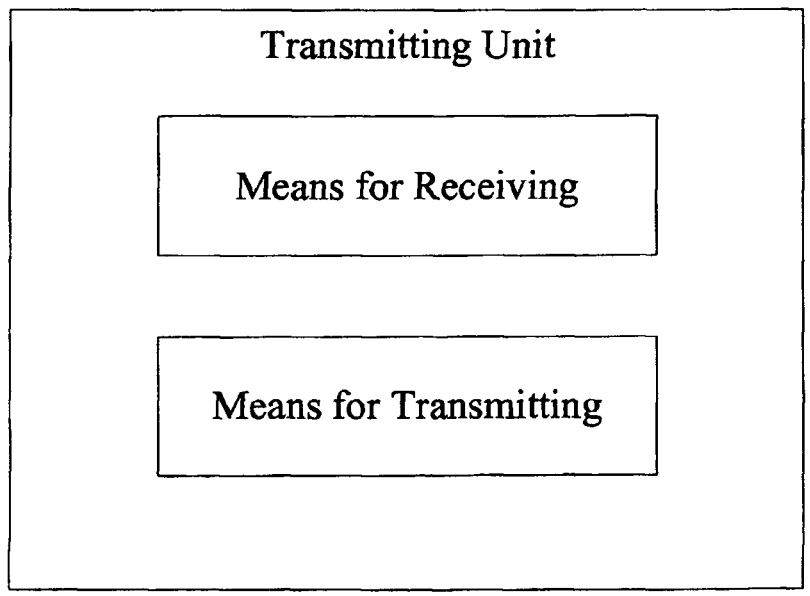

The method according to the invention is implemented in a receiving unit and/or in a transmitting unit, such as a mobile station/UE or a BTS/Node B, performed in software. An example of the receiving unit is shown in FIG. 5, and an example of the transmitting unit is shown in FIG. 6. Preferably, a DSP (Digital Signal Processor) or any other equivalent processor is used for executing the different steps of the method.

In Table 1, a comparison of the required feedback for the present invention is made to full feedback and to the feedback in background art using groups of size L OFDM sub-bands. The last two rows in Table 1 show required feedback for the present invention.

The results can be seen in Table 2. The throughput loss is within a few percent while the feedback is reduced by approximately one third which demonstrates that the precoding matrix index compression in the invention is very efficient.

TABLE 2

Simulation example. The throughput and feedback load is compared between full feedback and present invention. A 5 MHz bandwidth OFDM system in a TU (Typical Urban) channel with a single user was simulated with a codebook size of 8 elements.

| MIMO configuration | K | K' | Throughput | | Feedback load | |
| --- | --- | --- | --- | --- | --- | --- |
| | | | Full | Invention | Full | Invention |
| 4 × 2 | 12 | 3 | 2.14 Mb/s | 2.10 Mb/s | 36 bit | 11 bit |
| 2 × 2 | 12 | 6 | 3.39 Mb/s | 3.33 Mb/s | 36 bit | 13 bit |

The method, the receiving unit and the transmitting unit for reducing an amount of precoding feedback information according to the invention may be modified by those skilled in the art, as compared to the exemplary embodiments described above.

As is obvious for a skilled person, a number of other implementations, modifications, variations and/or additions can be made to the above described exemplary embodiments. It is to be understood that the invention includes all such other implementations, modifications, variations and/or additions provided that they fall within the scope of the claims.

REFERENCE DOCUMENTS

Each of the following documents referenced hereinabove is hereby incorporated by reference in its entirety and for everything that it teaches without exception.

TABLE 1

Comparison of the required signaling overhead to feed back precoding matrix index.
($\overline{N}$ is the number of bits needed to indicate an element in the codebook.)

| Feedback Compression Technique | Number of Feedback Bits to Signal Precoding Matrix Information | Number of Feedback Bits to Signal Label | Total Feedback | Example with K = 24, K' = 4, N = 3, L = 2 (as suggested in document[6]) |
| --- | --- | --- | --- | --- |
| None (full) | $K \cdot \overline{N}$ | 0 | $K \cdot \overline{N}$ | 72 bit |
| Grouping of L sub-bands, as in documents [6][7][3][4][5] | $\dfrac{K \cdot \overline{N}}{L}$ | 0 | $\dfrac{K \cdot \overline{N}}{L}$ | 36 bit |
| Selected sub-bands with P = K' | $K' \cdot \overline{N}$ | $\left\lceil \log_2 \binom{K}{K'} \right\rceil$ | $\left\lceil \log_2 \binom{K}{K'} \right\rceil + K' \cdot \overline{N}$ | 26 bit |
| Selected sub-bands with a single precoding matrix index, P = 1. (Example (b) in FIG. 2.) | $\overline{N}$ | $\left\lceil \log_2 \binom{K}{K'} \right\rceil$ | $\left\lceil \log_2 \binom{K}{K'} \right\rceil + \overline{N}$ | 17 bit |

A computer simulation was also carried out to compare the performance of using the full feedback and the feedback of selected bands with a single precoding matrix index (example (b) in FIG. 3).

[1] 3GPP R1-061246, *Unified uplink CQI signaling by efficient labeling*, Huawei, Shanghai, May 2006.

[2] PCT/CN/2006/0004, *Method for sub-band indicator signalling*, Huawei, Patent application, March 2006.

[3] J. Choi, R. W. Heath Jr., *Interpolation Based Unitary Precoding for Spatial Multiplexing MIMO-OFDM with Limited Feedback*, IEEE Globecom Conference 2004, Dallas, USA, November 2004, page 214-218

[4] J. Choi, R. W. Heath Jr., *Interpolation Based Transmit Beamforming for MIMO-OFDM with Limited Feedback*, IEEE Transactions on Signal Processing, Vol. 53, No. 11, November 2005, page 4125-4135.

[5] B. Mondahl, R. W. Heath Jr., *Algorithms for Quantized Precoding in MIMO OFDM Beamforming Systems*, Proceedings of the SPIE, Volume 5847, pp. 80-87 (2005).

[6] 3GPP R1-061441, *Feedback Reduction for Rank-1 precoding for E-UTRA downlink*, Texas Instruments, Shanghai, May 2006.

[7] 3GPP R1-061439, *Evaluation of Codebook-based Precoding for LTE MIMO Systems*, Texas Instruments, Shanghai, May 2006.

[8] 3GPP R1-031303, *System-level evaluation of OFDM—initial evaluation*, Ericsson, Nov. 17-21, 2003.

What is claimed is:

1. A method for reducing an amount of precoding feedback information in a multi-carrier Multiple-Input Multiple-Output (MIMO) communication system, characterized by comprising:
    carrying, at a receiving end of the system, information on a number of streams Ns using multiple sub-carriers being grouped together into a set $\Omega$ of K allowed sub-bands $(n_1, \ldots, n_K)$,
    jointly selecting, while considering transmission quality for each relevant combination of sub-bands and matrices, a limited number of P codebook indices and a limited number of K' sub-bands to be included in a subset $\omega$ $(m_1, \ldots, m_{K'})$ of the set $\Omega$, wherein K' is set to a value K'<K and P is set to a value P≦K', and
    conveying the P codebook indices and information identifying the subset $\omega$ to the transmitting end.

2. The method according to claim 1, wherein the P codebook indices are included in a vector $\Pi$.

3. The method according to claim 2, wherein the selections of codebook indices and corresponding sub-bands to be used for the subset $\omega$ are performed such that a transmission quality function is maximized.

4. The method according to claim 3, wherein the subset $\omega$ $(m_1, \ldots, m_{K'})$ and the P codebook indices in vector $\Pi$ fulfill:

$$\{\Pi, \omega\} = \arg\max_{\hat{\Pi}, \hat{\omega}} f(\hat{\Pi}, \hat{\omega}, N_S),$$

wherein
    $\Pi$ is a vector containing P precoding matrix indices corresponding to the sub-bands or groups of sub-bands in the subset of sub-bands $\omega$,
    $f$ is a scalar transmission quality function that takes the quality of transmission over multiple stream and multiple sub-band measures into consideration,
    K' is a given number defining the number of sub-bands for which codebook indices are to be conveyed, K'<K, and
    $N_S$ is a given number of streams.

5. The method according to claim 2, wherein codebook indices, sub-bands to be used for the subset $\omega$ and a number of streams are jointly selected with respect to a transmission quality function.

6. The method according to claim 5, wherein codebook indices and sub-bands to be used for the subset $\omega$ and a number of streams Ns are jointly selected such that the transmission quality function is maximized.

7. The method as claimed claim 6, wherein the subset $\omega$ $(m_1, \ldots, m_{K'})$, the P codebook indices in vector $\Pi$ and the number of streams Ns fulfill:

$$\{\Pi, \omega, N_S\} = \arg\max_{\hat{\Pi}, \hat{\omega}, \hat{N}_S} f(\hat{\Pi}, \hat{\omega}, \hat{N}_S),$$

wherein
    $\Pi$ is a vector containing P precoding matrix indices corresponding to the sub-bands or groups of sub-bands in the subset of sub-bands $\omega$,
    $f$ is a scalar transmission quality function that takes the quality of transmission over multiple stream and multiple sub-band measures into consideration,
    K' is a given number defining the number of sub-bands for which codebook indices are to be conveyed, K'<K, and
    $N_S$ is a number of streams.

8. The method according to claim 4, wherein the function $f$ is defined as:
$f(\Pi,\omega,N_s)=\min(\text{EESM}_1(\Pi,\omega,N_S), \Lambda, \text{EESM}_{N_S}(\Pi,\omega,N_S))$,
    wherein
    $\Pi$ is a vector containing P precoding matrix indices corresponding to the sub-bands or groups of sub-bands in the subset of sub-bands $\omega$,
    Ns is a number of streams, and
    EESM is an effective exponential SIR mapping function.

9. The method according to claim 4, wherein the function $f$ is defined as:

$$f(\Pi, \omega, N_S) = \sum_{s=1}^{N_S} \log_2(1 + EESM_s(\Pi, \omega, N_S)),$$

wherein
    $\Pi$ is a vector containing P precoding matrix indices corresponding to the sub-bands or groups of sub-bands in the subset of sub-bands $\omega$,
    Ns is a number of streams, and
    EESM is an effective exponential SIR mapping function.

10. The method according to claim 4, wherein the function $f$ is defined as:

$$f(\Pi, \omega, N_S) = \sum_{s=1}^{N_S} g_{BLER}(EESM_s(\Pi, \omega, N_S)),$$

wherein
    $\Pi$ is a vector containing P precoding matrix indices corresponding to the sub-bands or groups of sub-bands in the subset of sub-bands $\omega$,
    $N_S$ is a number of streams,
    EESM is an effective exponential SIR mapping function, and
    $g_{BLER}(x)$ is a function which maps EESM values to a corresponding largest possible code block size (number of information bits) which gives BLER less than a prescribed desired value.

11. The method according to claim 4, wherein the function $f$ is defined as:
$f(\Pi,\omega,N_s)=\text{EESM}_{1,\ldots,N_S}(\Pi,\omega,N_S)$, wherein Π is a vector containing P precoding matrix indices corresponding to the sub-bands or groups of sub-bands in the subset of sub-bands ω, $N_S$, is a number of streams, and EESM is an effective exponential SIR mapping function.

12. The method according to claim 1, wherein the transmitting end is a BTS/Node B and the receiving end is a mobile station/UE, or the transmitting end is a mobile station/UE and the receiving end is a BTS/node B.

13. The method according to claim 12, if the transmitting end is a BTS/Node B and the receiving end is a mobile station/UE, wherein the number of sub-bands K' for which codebook indices are to be conveyed is set by one of (1) a BTS/Node B and (2) a mobile station/UE.

14. The method according to claim 1, wherein the number of codebook indices P is one, P=1, or the number of codebook indices P is set to a predetermined value, preferably given in a system standard.

15. The method according to claim 1, wherein a precoding matrix index for a complementary set $\bar{\omega}$ is conveyed to the transmitted end in addition to the P precoding matrix indices for the subset ω, wherein $\bar{\omega}$Y ω=Ω and Ω is the total set of allowed sub-bands.

16. The method according to claim 1, wherein a precoding matrix index for a complementary set $\bar{\omega}$ is fixed, wherein $\bar{\omega}$Y ω=Ω and Ω is the total set of allowed sub-bands.

17. The method according to claim 16, wherein the fixed precoding matrix includes one of (1) an identity matrix and (2) selected columns from an identity matrix.

18. The method according to claim 1, wherein the information identifying the subset is included in a bitmap representation.

19. A method for reducing an amount of precoding feedback information in a multi-carrier Multiple-Input Multiple-Output (MIMO) communication system, wherein information is carried on a number of streams Ns using multiple sub-carriers being grouped together into a set Ω of K allowed sub-bands ($n_1, \ldots, n_K$), characterized by comprising:

selecting, at a transmitting end, a suitable precoding matrix to be used from a precoding codebook based on codebook indices fed back from a receiving end, receiving information identifying a limited number of K' sub-bands in a subset ω($m_1, \ldots, m_{K'}$) of the set Ω and a limited number of P codebook indices to be used for the K' sub-bands in the subset ω, the information and the vector being jointly selected, while considering transmission quality for each relevant combination of sub-bands and matrices, and being fed back from the receiving end, and transmitting on the K' sub-bands using the P codebook indices.

20. A receiving unit arranged for reducing an amount of precoding feedback information in a multi-carrier Multiple-Input Multiple-Output (MIMO) communication system, the system being arranged for carrying information on a number of streams Ns using multiple sub-carriers being grouped together into a set Ω of K allowed sub-bands ($n_1, \ldots, n_K$), characterized in that the receiving unit comprises:

means for jointly selecting, while considering transmission quality for each relevant combination of sub-bands and matrices, a limited number of P codebook indices and a limited number of K' sub-bands to be included in a subset ω ($m_1, \ldots, m_{K'}$) of the set Ω, wherein K' is set to a value K'<K and P is set to a value P≦K', and means for conveying the P codebook indices and information identifying the subset ω to the transmitting unit.

21. The receiving unit according to claim 20, wherein the receiving unit is (1) a mobile station/UE.

22. The method according to claim 7, wherein the function $f$ is defined as:

$f(Π,ω,N_S)$=min($EESM_1(Π,ω,N_S)$, Λ, $EESM_{N_S}(Π,ω,N_S)$), wherein

Π is a vector containing P precoding matrix indices corresponding to the sub-bands or groups of sub-bands in the subset of sub-bands ω, Ns is a number of streams, and EESM is an effective exponential SIR mapping function.

23. The method according to claim 7, wherein the function $f$ is defined as:

$$f(Π, ω, N_S) = \sum_{s=1}^{N_S} \log_2(1 + EESM_s(Π, ω, N_S)),$$

wherein

Π is a vector containing P precoding matrix indices corresponding to the sub-bands or groups of sub-bands in the subset of sub-bands ω, Ns is a number of streams, and EESM is an effective exponential SIR mapping function.

24. The method according to claim 7, wherein the function ω is defined as:

$$f(Π, ω, N_S) = \sum_{s=1}^{N_S} g_{BLER}(EESM_s(Π, ω, N_S)),$$

wherein

Π is a vector containing P precoding matrix indices corresponding to the sub-bands or groups of sub-bands in the subset of sub-bands ω, $N_S$, is a number of streams, EESM is an effective exponential SIR mapping function, and $g_{BLER}(x)$ is a function which maps EESM values to a corresponding largest possible code block size (number of information bits) which gives BLER less than a prescribed desired value.

25. The method according to claim 7, wherein the function ω is defined as:

$f(Π,ω,N_s)$ =$EESM_{1,\ldots,N_s}(Π,ω,N_s)$, wherein

Π is a vector containing P precoding matrix indices corresponding to the sub-bands or groups of sub-bands in the subset of sub-bands ω, $N_S$ is a number of streams, and EESM is an effective exponential SIR mapping function.

26. The receiving unit according to claim 20, wherein the receiving unit is (2) a BTS/Node B.

* * * * *

UNITED STATES PATENT AND TRADEMARK OFFICE
CERTIFICATE OF CORRECTION

| | |
|---|---|
| PATENT NO. | : 7,817,739 B2 |
| APPLICATION NO. | : 12/341362 |
| DATED | : October 19, 2010 |
| INVENTOR(S) | : Wennström et al. |

It is certified that error appears in the above-identified patent and that said Letters Patent is hereby corrected as shown below:

Please delete patent 7,817,739 in its entirety and insert patent 7,817,739 in its entirety as attached Signed and Sealed this
Twenty-seventh Day of March, 2012

David J. Kappos
*Director of the United States Patent and Trademark Office*

(12) United States Patent
Wennström et al.

(10) Patent No.: US 7,817,739 B2
(45) Date of Patent: Oct. 19, 2010

(54) METHOD FOR REDUCING FEEDBACK INFORMATION OVERHEAD IN PRECODED MIMO-OFDM SYSTEMS

(75) Inventors: Mattias Wennström, Uppsala (SE); Jaap Van De Beek, Täby (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 12/341,362

(22) Filed: Dec. 22, 2008

(65) Prior Publication Data
US 2009/0147880 A1   Jun. 11, 2009

Related U.S. Application Data

(63) Continuation of application No. PCT/CN2006/001403, filed on Jun. 20, 2006.

(51) Int. Cl.
*H04K 1/00* (2006.01)
(52) U.S. Cl. ......... 375/260; 375/267; 375/299; 375/347
(58) Field of Classification Search .................. 375/260, 375/267, 299, 347
See application file for complete search history.

(56) References Cited

U.S. PATENT DOCUMENTS

| | | |
|---|---|---|
| 2005/0095996 A1 | 5/2005 | Takano |
| 2005/0157808 A1 | 7/2005 | Ihm et al. |
| 2006/0071807 A1 | 4/2006 | Sadowsky |
| 2006/0093065 A1 | 5/2006 | Thomas et al. |
| 2006/0109923 A1 * | 5/2006 | Cai et al. ............ 375/260 |

FOREIGN PATENT DOCUMENTS

| | | |
|---|---|---|
| CN | 1614906 A | 5/2005 |
| WO | WO 2007/109917 A1 | 10/2007 |

OTHER PUBLICATIONS

Huawei, "Unified Uplink CQI Signaling by Efficient Labeling,"3GPP (*Technical Specification Group RAN WG1 Meeting 45*), R1-061246:1-7 (May 2006).
Zhang et al., A Tracking Approach for Precoded MIMO-OFDM Systems with Low Data Rate CSI Feedback, *IEEE International Symposium on Personal Indoor and Mobile Radio Communications*, 1:241-245 (Sep. 2005).
Huawei, "Downlink Adaptation/Scheduling Guided by an Efficient CQI-Feedback Scheme," 3GPP (*Technical Specification Group RAN WG1 Meeting 44 bis*), R1-060821:1-5 (Mar. 2006).
European Search Report (Jan. 20, 2010).
State Intellectual Property Office of the People's Republic of China, Examination Report in Chinese Patent Application No. 200680024209.5 (Mar. 20, 2009).

(Continued)

*Primary Examiner* — Kevin Y Kim
(74) *Attorney, Agent, or Firm* — Leydig, Voit & Mayer, Ltd.

(57) ABSTRACT

An improved method for reducing an amount of precoding feedback information in a multi-carrier Multiple-Input Multiple-Output (MIMO) communication system using precoding is disclosed. At the receiving end, the method jointly selects, while considering transmission quality for each relevant combination of sub-bands and matrices, a limited number of P codebook indices and a limited number of K' sub-bands to be included in a subset $\omega$ $(m_1, \ldots, m_{K'})$ of a set $\Omega$ of allowed sub-bands. K' is here set to a value K'<K and P is set to a value P≦K'. The P codebook indices and information identifying the subset $\omega$ is then conveyed to the transmitting end.

31 Claims, 4 Drawing Sheets

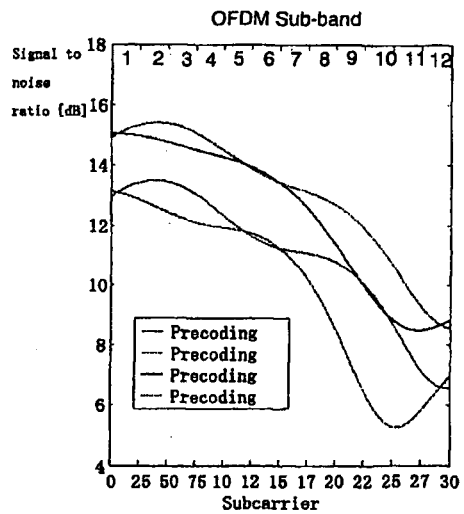

OTHER PUBLICATIONS

Texas Instruments, "Feedback Reduction for Rank-1 Pre-coding for E-UTRA Downlink," 3GPP TSG RAN WG1 #45, R1-061441 (May 2006).

Texas Instruments, "Evaluation of Codebook-Based Preceding for LTE MIMO Systems," 3GPP TSG RAN WG1 #45, R1-061439 (May 2006).

Ericsson, "System-Level Evaluation of OFDM—Further Considerations," 3GPP (Technical Specification Group (TSG-RAN WG1 #35), R1-031303 (Nov. 2003).

Choi et al., "Interpolation Based Transmit Beamforming for MIMO-OFDM with Limited Feedback," IEEE Transactions on Signal Processing, vol. 53, No. 11, pp. 4125-4135 (Nov. 2005).

Choi et al., "Interpolation Based Unitary Preceding for Spatial Multiplexing MIMO-OFDM with Limited Feedback," IEEE Communications Society, Globecom 2004, pp. 214-218 (2004).

Mondal et al., "Algorithms for Quantized Preceding in MIMO OFDM Beamforming Systems," Wireless Networking and Communications Group, The University of Texas at Austin, 5847-12 V.1, p. 1-8 (Feb. 28, 2005).

Communication Under Rule 71(3) EPC Regarding Grant of European Patent Application No. 06 742 199.0, Sep. 2009.

European Patent Application No. 06 742 199.0 as allowed by the European Patent Office, Aug. 2009.

* cited by examiner

METHOD FOR REDUCING FEEDBACK INFORMATION OVERHEAD IN PRECODED MIMO-OFDM SYSTEMS

CROSS-REFERENCE TO RELATED APPLICATIONS

This application is a continuation of International Application No. PCT/CN2006/001403, filed on Jun. 20, 2006, which is hereby incorporated by reference in its entirety.

FIELD OF THE INVENTION

The present invention relates to the filed of communication technologies, and in particular to a method, a receiving unit and a transmitting unit for reducing the amount of precoding feedback information at a receiving and/or a transmitting end of a communication system.

BACKGROUND

In wireless communication systems utilizing multiple antennas at both transmitter and receiver, commonly known as Multiple-Input Multiple-Output (MIMO) systems, it is well known in background art that the performance is greatly enhanced if linear MIMO precoding can be used at the transmitter side. Such linear precoding has been implemented in the IEEE 802.16-2005 Standard and is also suggested for 3GPP E-UTRA.

Orthogonal Frequency Division Multiplexing (OFDM) combined with MIMO enables an extension of the MIMO precoding to frequency selective MIMO channels. In MIMO-OFDM, a broadband channel is converted into multiple narrowband channels corresponding to OFDM subcarriers. Each narrowband channel can be assumed to be flat fading.

Furthermore, equal size groups of adjacent OFDM subcarriers are formed to obtain OFDM sub-bands. A common value, used in 3GPP E-UTRA, is 25 adjacent OFDM subcarriers which form an OFDM sub-band. Hence, the total bandwidth is divided into K sub-bands. The width of each sub-band is chosen so that the channel is approximately flat fading within each sub-band. This implies that the same best precoding matrix is approximately valid for all subcarriers within a sub-band.

A problem arising in MIMO-OFDM is that due to frequency selective scheduling, the feedback overhead increases since the channel quality becomes a function of a number of OFDM sub-bands. In addition, when codebook based linear MIMO precoding is applied, the receiver needs to indicate the precoding matrix index (PMI) to the codebook for each OFDM sub-band as well. This means that the signaling overhead burden becomes significant and methods must be found to reduce this overhead.

For codebook based precoded MIMO-OFDM, some background arts exist, which all exploit the correlation of optimal precoding matrices on adjacent subcarriers or sub-bands to reduce the feedback of precoding information.

At the end of this specification, a number of background art documents are listed.

In document [6] "3GPP R1-061441, *Feedback Reduction for Rank-1 Pre-coding for E-UTRA Downlink*, Texas Instruments, Shanghai, May 2006" and document [7] "3GPP R1-061439, *Evaluation of Codebook-based Precoding for LTE MIMO Systems*, Texas Instruments, Shanghai, May 2006", a grouping approach is described where the feedback of precoding information is reduced by creating larger groups of adjacent subcarriers and finding a precoding matrix which is valid on average for this larger group. For instance, it is recommended in document [6] that a precoding matrix index for every second OFDM sub-band is sufficient with only a small degradation in performance compared to feeding back a precoding matrix index for every OFDM sub-band. In this way the feedback overhead for the precoding matrix is halved.

The same basic approach is taken in document [3] "J. Choi, R. W. Heath Jr., *Interpolation Based Unitary Precoding for Spatial Multiplexing MIMO-OFDM with Limited Feedback*, IEEE Globecom Conference 2004, Dallas, USA, November 2004, page 214-218)" and document [4] "(J. Choi, R. W. Heath Jr., *Interpolation Based Transmit Beamforming for MIMO-OFDM with Limited Feedback*, IEEE Transactions on Signal Processing, Vol. 53, No. 11, November 2005, page 4125-4135". The authors here suggest reporting precoding matrix indices for every L:th OFDM subcarrier, uniformly sampled over the whole bandwidth. In the transmitter, a reconstruction of the intermediate precoding matrix indices is performed using interpolation.

In document [5] "B. Mondahl, R. W. Heath Jr., Algorithms for Quantized Precoding in MIMO-OFDM Beamforming Systems, Proceedings of the SPIE, Volume 5847, pp. 80-87, 2005", an alternative approach is suggested, where the channel information (precoding matrix information) is quantized in the time domain, instead of the frequency domain, where the transform decorrelates the channel information. The idea is to decorrelate the precoding matrix information before quantization. The performance of this method is shown to be similar to the grouping proposal in document [4].

The background art precoding matrix index feedback signaling reduction methods all have the disadvantage that they often feed back information that is not used at a transmitting end of the system. The background art solutions for reducing the precoding matrix index feedback overhead do not take into consideration that some information is more valuable than other information at the transmitting end.

There is thus a need for a method that intelligently chooses which information to feed back so as to further reduce the amount of precoding matrix index feedback signaling overhead.

SUMMARY

It is an object of the present invention to provide methods, a receiving unit and a transmitting unit for reducing the amount of precoding feedback information at the receiving and transmitting ends of a communication system.

In particular, it is an object of present invention to provide methods, a receiving unit and a transmitting unit that reduce the amount of matrix index feedback signaling more than the methods in the prior art.

It is also an object of present invention to provide methods, a receiving unit and a transmitting unit that limit the matrix index feedback signaling to information that will be useful in the system.

These objects are achieved by precoding feedback information reducing methods according to the characterizing portions of claims 1 and 19.

These objects are also achieved by precoding feedback information reducing receiving and transmitting units according to the characterizing portions of claims 20 and 22.

The methods, receiving unit, and transmitting unit according to the invention make it possible, at the receiving end, to effectively decide that which information will be needed at the transmitting end and then feed back this information.

This is achieved by the methods, the receiving unit, and the transmitting unit according to the invention since they do not waste communication resources on signaling information regarding sub-bands having poor quality.

Because of this, the methods, the receiving unit, and the transmitting unit according to the invention limit the fed back information to only include information regarding sub-bands that are probable for being scheduled for transmission. The amount of feedback information can thereby be reduced.

The invention presents a solution having a good tradeoff between throughput and feedback reduction.

In an embodiment of the present invention, rank adaptation can be performed, i.e. a number of streams can also be selected jointly with a subset and a vector of precoding codebook indices. This can be advantageous for maximizing throughput of a connection.

In an embodiment of the present invention, the number of elements in a precoding codebook indices vector can be set to a very low value, for instance the value one. This is a very effective alternative for reducing the feedback signaling. This embodiment is also advantageous for situations where the performance of the precoding matrices is highly correlated over the OFDM sub-bands.

In an embodiment of the present invention, a precoding matrix index can be fed back for a complementary subset consisting of the sub-bands not selected by the method. As an alternative, the precoding matrix used for the complementary subset may be fixed. This has the advantage that very little information has to be fed back if the scheduler decides to schedule a sub-band within the complementary subset for transmission.

In an embodiment of the present invention, a bitmap is used for identifying selected subsets. The bitmap representation is an efficient compression method that further reduces the amount of transmitted feedback information.

Detailed exemplary embodiments and advantages of the methods, receiving unit, and transmitting unit for reducing the amount of matrix index feedback signaling according to the present invention will now be described with reference to the appended drawings illustrating some preferred embodiments.

BRIEF DESCRIPTION OF THE DRAWINGS

FIG. 1 shows selection of a subset X from a set of all available sub-bands $\Omega$ and identifying the subset $\omega$ using a bitmap B;

FIG. 2 shows selection of a subset $\omega$ from a set of all available sub-bands $\Omega$ and then, in (a) and (b) using grouping approaches for the subset $\omega$;

FIG. 3 shows an example of an SNR plot for precoding matrices and sub-bands in the OFDM sub-band spectrum;

FIG. 4 shows another example of an SNR plot for precoding matrices and sub-bands in the OFDM sub-band spectrum;

FIG. 5 shows an example of a receiving unit; and

FIG. 6 shows an example of a transmitting unit.

DETAILED DESCRIPTION

In a flat fading, non-precoded MIMO system with $N_T$ transmitter antennas and $N_R$ receiver antennas, the input-output relationship can be described as $$y = Hx + n. \qquad (1)$$

In equation (1), x is the $N_T \times 1$ vector of transmitted symbols, y,n are the $N_R \times 1$ vectors of received symbols and noise respectively and H is the $N_R \times N_T$ matrix of channel coefficients. The transmitter symbols are thus $N_T$-fold spatially multiplexed over the MIMO channel H or in other words, $N_T$ streams are transmitted in parallel, leading to a theoretically $N_T$-fold increase in spectral efficiency.

Linear precoding implies that a $N_T \times N_S$ precoding matrix W is introduced in (1) to precode the symbols in the vector x. The column dimension $N_S$ can be selected to be smaller than $N_T$ in which case x is modified to dimension $N_S \times 1$. Hence, $N_S$ streams are transmitted in parallel, which is known as rank adaptation and implies that fewer symbols are spatially multiplexed over the channel. Rank adaptation is useful since the symbol error probability is decreased, although fewer symbols are spatially multiplexed. The input-output relation for precoded MIMO is thus described as $$y = HWx + n \qquad (2)$$

To select the best precoder matrix W in (2), knowledge about the channel H and the receiver noise statistics is necessary. Therefore, the selection is preferably made in the receiver since this information is readily available there. The selected precoder W is then signaled to the transmitter, which implements the precoding according to the receiver preference. To reduce the signaling burden between the receiver and the transmitter, it is commonly assumed that the precoding matrix W belongs to a fixed set of precoding matrices, known as the precoding codebook. If the codebook has N elements, $\tilde{N} = \lceil \log_2(N) \rceil$ bits are needed to indicate an element in the codebook and thus only the precoding matrix index (PMI) needs to be signaled from the receiver to the transmitter.

Orthogonal Frequency Division Multiplexing (OFDM) combined with MIMO enables an extension of the MIMO precoding to frequency selective MIMO channels. In MIMO-OFDM, a broadband channels is converted into multiple narrowband channels corresponding to OFDM subcarriers. Each narrowband channel can assumed to be flat fading. Using OFDM, equations (1) and (2) are thus valid for each such narrowband channel.

Furthermore, equal size groups of adjacent OFDM subcarriers are formed to obtain OFDM sub-bands. A common value, used in 3GPP E-UTRA, is 25 adjacent OFDM subcarriers which form an OFDM sub-band. Hence, the total bandwidth is divided into K sub-bands. The width of each sub-band is chosen so that the channel is approximately flat fading within each sub-band. This implies that the same best precoding matrix W in (2) is approximately valid for all subcarriers within a sub-band. Hence, the minimum necessary granularity in the PMI feedback is one sub-band and it is only necessary to feed back one PMI per sub-band.

In OFDM systems, frequency selective scheduling is performed. Since the channel quality, such as signal to interference ratio, varies over the transmission bandwidth, frequency selective scheduling and multi-user scheduling are applied, e.g. in systems such as E-UTRA and IEEE 802.16.

To realize frequency selective scheduling, a receiver indicates, on a feedback channel, which Q sub-bands in the K OFDM sub-bands are more applicable to receive data, and also indicates the quality indicators for these Q sub-bands. A natural choice for the receiver is to indicate the Q sub-bands which have the highest signal to interference ratio among the K OFDM sub-bands. This is shown in background art document [1] "3GPP R1-061246, *Unified uplink CQI signalling by efficient labeling*, Huawei, Shanghai, May 2006".

Background art document [2] "PCT/CN/2006/0004, *Method for sub-band indicator signaling*, Huawei, Patent application, March 2006" further shows an efficient method to signal the subset of Q sub-bands out of K available sub-bands.

In the present invention, an approach is taken which combines the physical layer behavior of precoding with the actions of the scheduling layer. Hence, a cross-layer approach is taken.

The inventors of the present invention have made an observation that a user will not be scheduled on its OFDM sub-bands where its channel quality is poor due to, e.g., competition from other users.

The inventors of the present invention have further discovered that precoding matrix indices for the OFDM sub-bands with the highest channel qualities are correlated. This means that a precoding matrix that works well for one sub-band having high quality is likely to also work well for another sub-band having high quality. The inventors have then realized that this discovery could be used for reducing the number of precoding matrices used.

Therefore, there is no gain in feeding back precoding matrix information for all OFDM sub-bands, since this information will not be used by the transmitter, unless all sub-bands are scheduled to the user in which case no frequency scheduling gain is obtained.

Hence, the present invention differs from background art documents [3], [4], [5], [6] and [7] in that no attempt to fully describe the precoding matrix index for the whole bandwidth is made. Instead, the invention describes only the precoding matrix indices for those OFDM sub-bands where transmission is likely to take place due to high channel quality.

The bands the receiver desires to be scheduled on could efficiently be signaled using the labeling technique of document [1], and the precoding matrix indicator signaling could preferably coincide with the signaling of the channel quality information.

The OFDM bandwidth can be divided into sub-bands of equal frequency bandwidth among which K are allowed and available for scheduling. This set of K sub-bands is denoted $\Omega$. A receiver decides to generate a precoding matrix index report for a smaller subset $\omega$ consisting of K' out of the total K sub-bands in $\Omega$.

A label that uniquely defines the set $\omega$ may be generated using a bitmap B. This is shown in FIG. 1, wherein the bandwidth is divided into K (K=12) frequency sub-bands. K' (K'=4) sub-bands are selected and may be labeled by the bitmap mask B. An efficient bitmap compression method may also be used, see documents [1] and [2].

The precoding matrix index report can now be generated for the subset $\omega$ of OFDM sub-bands. This is shown in FIG. 2, wherein an efficient compression of precoding information using the subset $\omega$ of K' (K'=4) sub-bands is performed. The precoding matrix information in $\omega$ can be further compressed by using for example a grouping approach (a) or a single precoding matrix index for the whole subset $\omega$ as shown in example (b).

According to the present invention, for selection of the subset $\omega$ of K' sub-bands an optimization criterion is used $$\{\Pi, \omega\} = \arg\max_{\Pi,\omega} f(\hat{\Pi}, \hat{\omega}, N_S) \quad (3)$$

where $\Pi$ is a vector containing the precoding matrix indices for the corresponding sub-bands in the vector $\omega$, which elements are selected from $\Omega$, constituting the full set of allowed frequency sub-bands. Furthermore, $N_S$ is the rank of the transmission, i.e. the number of transmitted streams. The function $f$ is a scalar metric that maps multiple stream and multiple sub-band measures into a single real number.

In an embodiment of the present invention, the K' best bands are found, which maximize the metric $f$ as in equation (3), where each band is using its best preceding matrix index and where K' is a given number. In this embodiment, $\Pi$ contains a number of elements P that can be up to the number of selected sub-bands K'. There can thus in this embodiment different precoding matrix indices be chosen for every one of the K' sub-bands selected for $\omega$. Up to P (P=K') precoding matrix indices and a set of K' sub-bands in the vector $\omega$ are jointly found which solves equation (3) in this embodiment.

In an alternative embodiment, to further reduce the feedback, the vector $\Pi$ of preceding matrix indices is chosen to have fewer elements than the corresponding sub-band vector $\omega$. An example is to group the sub-bands in the vector $\omega$ and report one precoding matrix index for each group of sub-bands. Hence a grouping method similar to the one in background art document [6] is used although here the grouping is performed on the selected sub-bands $\omega$ and not on the whole set of sub-bands $\Omega$. In this embodiment, $\Pi$ contains a number of elements P that is less than the number of selected sub-bands K'. Up to a number P<K' precoding matrix indices and a set of K' sub-bands in the vector $\omega$ are jointly found which solve equation (3) in this embodiment. See example (a) in FIG. 2, where P is set to two, i.e., P=2.

In an alternative embodiment of the present invention, the vector $\Pi$ of precoding matrix indices has a single element. In this embodiment, $\Pi$ contains a number of elements P being equal to one. Hence, a single precoding matrix index and a set of K' sub-bands in the vector $\omega$ are jointly found which solves equation (3). See example (b) in FIG. 2.

FIG. 3 shows an example of a Signal to Noise Ratio (SNR) plot for precoding matrices and sub-bands in the OFDM sub-band spectrum. The plot in FIG. 3 will hereafter be used for illustrating how combinations of precoding matrix index and sub-bands can be jointly selected according to the present invention.

In a first example according to the invention with reference to FIG. 3, the number of elements P in $\Pi$ is set to one, i.e., P=1, and the number of sub-bands to be selected K' is set to four, i.e., K'=4. The method according to the present invention then searches through all possible combinations of indices and sub-bands, in this particular case searches for the one matrix that gives best transmission quality when being used for four sub-bands, and for which set of four sub-bands this matrix is to be used. Here matrix 3 and sub-bands 4, 5, 6 and 12 are selected.

In a second example according to the present invention with reference to FIG. 3, P and K' are set to, i.e., P=2 and K'=4. The selection in this example differs from the selection in the previous example in that sub-band 7 and matrix 1 will be chosen instead of sub-band 12. This is appropriate since two matrix indices can be selected and matrix 1 has higher SNR in sub-band 7 than matrix 3 has in sub-band 12.

Background art methods for reducing precoding matrix index signaling have had solutions that send precoding matrix indices for a fixed subset of sub-bands, for example every second sub-band. This could have the effect that a lot of the precoding matrix index signaling is made for sub-bands having such a bad quality that they should not be scheduled by the scheduler. The background art methods are therefore suboptimal.

In the example in FIG. 3, if a background art method using every second sub-band could, for example, using a fixed subset of sub-bands 1, 3, 5, 7, 9, and 11, the background art method would then have chosen the best possible precoding matrix for each of these sub-bands and would have conveyed precoding matrix index signaling for the precoding matrixes found in each sub-band. Sub-bands 1, 3 and 11 have, as can be seen in FIG. 3, very bad SNR for all matrixes, especially sub-band 3, and would probably not be scheduled anyway. The signaling regarding these sub-bands in the background art solutions would therefore be a waste of communications resources.

When precoding matrix indices and a set of K' sub-bands are selected according to the present invention, that is by using equation (3) for jointly finding precoding matrix indices and a set of K' sub-bands given the number of available precoding matrix indices and the number K', the best possible combinations of sub-bands and precoding matrix indices to use on these sub-bands are selected.

This equation (3) goes through all possible combinations of available sub-bands and precoding matrix indices and selects the combinations that maximize function $f$. Function $f$ gives a measure of transmission quality. Equation (3) thus selects the combinations that result in the highest possible transmission qualities. Equation (3) therefore also selects combinations that are probable to be scheduled by a scheduler. Function $f$ will be further described below.

FIG. 4 shows another SNR (Signal to Noise Ratio) plot for precoding matrices and sub-bands in the OFDM sub-band spectrum. As can be seen in FIG. 4, sometimes some of the precoding matrices are generally better than the others. In a situation like this, the embodiment of the present invention in which the vector $\Pi$ of precoding matrix indices has a single element, P=1, can be especially advantageous. Since one particular precoding matrix is the best matrix over more or less the whole bandwidth, the method according to the present invention, where P=1, is then more or less simplified to a choice of sub-bands.

The selection of sub-bands and precoding matrices can also be extended to rank adaptation, where the rank, i.e. the number of streams $N_S$ is selected as $$\{\Pi, \omega, N_S\} = \arg\max_{\tilde{\Pi},\tilde{\omega},\tilde{N}_S} f(\tilde{\Pi}, \tilde{\omega}, \tilde{N}_S) \quad (4)$$

When equation (4) is used, precoding matrix indices, a set of K' sub-bands in the vector $\omega$ and number of streams Ns are jointly found which solve equation (4). This can, in the same way as for equation (3), be done for different numbers P of elements in $\Pi$. When equation (4) is used, rank adaptation decisions are made in the receiving end. This can be advantageous regarding the possibilities of maximizing throughput for a connection. When equation (3) is used, Ns is set at the BTS/Node B.

The metric function $f$ in equations (3) and (4) above is a function of the sub-bands in the vector $\omega$, its corresponding length K' and the precoding matrix index/indices in $\Pi$. It can be implemented in various ways. One embodiment is to use the effective exponential SIR mapping (EESM) in document "[8] (3GPP R1-031304, *System-level evaluation of OFDM—initial evaluation*, Ericsson, Nov. 17-21, 2003)" for each stream, assuming a certain set of sub-bands $\omega$ and a vector of PMI or a single PMI used for all sub-bands in $\omega$, and then use the following expression for $f$:

$$f(\Pi,\omega,N_S)=\min(EESM_1(\Pi,\omega,N_S),\Lambda,EESM_{N_S}(\Pi,\omega,N_S)) \quad (5)$$

where $N_S$ is the number of streams and $EESM_S(\Pi,\omega,N_S)$ is the EESM for stream s assuming $N_S$ streams and the use of precoder matrices with indices in the vector $\Pi$ and the sub-bands $\omega$. The EESM is also a function of the channel matrix H and covariance matrix of the interference, but it has been omitted in the notation in here for clarity.

Another alternative is to map the EESM to mutual information for each stream assuming a certain set of sub-bands $\omega$ and a vector of PMI, or a single PMI, and then sum the throughputs or mutual information for each stream and sub-band to obtain the scalar output of the of the metric function $f$ as $$f(\Pi, \omega, N_S) = \sum_{s=1}^{N_S} \log_2(1 + EESM_s(\Pi, \omega, N_S)) \quad (6)$$

Another alternative is to consider f to reflect the expected sum throughput at a given block error rate (BLER)

$$f(\Pi, \omega, N_S) = \sum_{s=1}^{N_S} g_{BLER}(EESM_s(\Pi, \omega, N_S)) \quad (7)$$

Where $g_{BLER}(x)$ is a function which maps EESM values to a corresponding largest possible code block size (number of information bits) which gives BLER less than a prescribed desired value. Hence, equation (7) gives the sum of the code block sizes for each stream and this number is proportional to the expected throughput.

The approaches in equations (5), (6) and (7) assume multiple code words, where each stream transmits a separately encoded block of information. Another alternative is to use a single (larger) codeword, which is interleaved and mapped over all streams, in which case as single EESM value is obtained for the whole codeword $$f(\Pi,\omega,N_S)=EESM_{1,\ldots,N_S}(\Pi,\omega,N_S) \quad (8)$$

As is understood by a person skilled in the art, this metric function $f$ can be calculated in a number of ways. There are a number of different definitions for transmission quality and also a number of different ways to estimate transmission quality. Equations (5) and (8) give an SNR measure, equation (6) gives a capacity measure and equation (7) gives a measure of realistic throughput. These are all different measures of transmission quality, but there are also a number of other measures of transmission quality known in the field of communications. Equations (5)-(8) above are thus to be seen as four examples out of a number of possible ways to perform this estimation. The scope of the present invention is not limited to equations (5)-(8) above.

In an embodiment, the receiver can feed back a precoding matrix index for the complementary set $\bar{\omega}$ of sub-bands in addition to the precoding matrix index/indices for the subset $\omega$, where $\bar{\omega}Y\omega=\Omega$. If the scheduler decides to transmit using sub-bands in the subset $\bar{\omega}$ it can utilize the precoding matrix index for the complementary set of sub-bands.

Alternatively, the precoding matrix for the sub-bands in $\bar{\omega}$ could be fixed. Then no signaling is required for precoding matrix indication of these sub-bands. Specifically, the fixed precoding matrix in this case could be the identity matrix, or if the precoding matrix is not square, it could be selected columns from an identity matrix.

In all the above described embodiments the compression of precoding matrix index information in the subset $\omega$ can be made with arbitrary compression method, such as average run-length coding or any other compression method known in the art.

The sub-bands in ω can also be further divided into multiple sub-sub-bands where each sub-sub-band has a certain unique precoding matrix index. The latter approach also requires a label to point out how the division of ω into sub-sub-bands is made.

In an embodiment, the transmitting end is a BTS/Node B and the receiving end is a mobile station/UE. In this embodiment, the mobile station/UE conveys precoding vector Π, subset ω and possibly number of streams Ns to the BTS/Node B. BTS/Node B here regards this conveyed information as a recommendation, but do not have to follow this recommendation strictly. In this embodiment K' may be set by the BTS/Node B, and may also be set by the mobile station/UE.

In an embodiment, the transmitting end is a mobile station/UE and the receiving end is a BTS/node B. In this embodiment, BTS/node B conveys a scheduling grant containing precoding vector Π, subset ω and possibly number of streams Ns to the mobile station/UE. Mobile station/UE here strictly has to follow the conveyed information.

In an embodiment, the number of elements P in Π is set in the system standard and the value of P can possibly be set based on varying kinds of data, such as system bandwidth, communication statistics or the like.

The method according to the invention is implemented in a receiving unit and/or in a transmitting unit, such as a mobile station/UE or a BTS/Node B, performed in software. An example of the receiving unit is shown in FIG. 5, and an example of the transmitting unit is shown in FIG. 6. Preferably, a DSP (Digital Signal Processor) or any other equivalent processor is used for executing the different steps of the method.

In Table 1, a comparison of the required feedback for the present invention is made to full feedback and to the feedback in background art using groups of size L OFDM sub-bands. The last two rows in Table 1 show required feedback for the present invention.

approximately one third which demonstrates that the precoding matrix index compression in the invention is very efficient.

TABLE 2

Simulation example. The throughput and feedback load is compared between full feedback and present invention. A 5 MHz bandwidth OFDM system in a TU (Typical Urban) channel with a single user was simulated with a codebook size of 8 elements.

| MIMO config-uration | K | K' | Throughput | | Feedback load | |
|---|---|---|---|---|---|---|
| | | | Full | Invention | Full | Invention |
| 4 × 2 | 12 | 3 | 2.14 Mb/s | 2.10 Mb/s | 36 bit | 11 bit |
| 2 × 2 | 12 | 6 | 3.39 Mb/s | 3.33 Mb/s | 36 bit | 13 bit |

The method, the receiving unit and the transmitting unit for reducing an amount of precoding feedback information according to the invention may be modified by those skilled in the art, as compared to the exemplary embodiments described above.

As is obvious for a skilled person, a number of other implementations, modifications, variations and/or additions can be made to the above described exemplary embodiments. It is to be understood that the invention includes all such other implementations, modifications, variations and/or additions provided that they fall within the scope of the claims.

REFERENCE DOCUMENTS

Each of the following documents referenced hereinabove is hereby incorporated by reference in its entirety and for everything that it teaches without exception.

[1] 3GPP R1-061246, *Unified uplink CQI signaling by efficient labeling*, Huawei, Shanghai, May 2006.

TABLE 1

Comparison of the required signaling overhead to feed back precoding matrix index.
(N is the number of bits needed to indicate an element in the codebook.)

| Feedback Compression Technique | Number of Feedback Bits to Signal Precoding Matrix Information | Number of Feedback Bits to Signal Label | Total Feedback | Example with K = 24, K' = 4, N = 3, L = 2 (as suggested in document[6]) |
|---|---|---|---|---|
| None (full) | K · N | 0 | K · N | 72 bit |
| Grouping of L sub-bands, as in documents [6][7][3][4][5] | $\frac{K \cdot N}{L}$ | 0 | $\frac{K \cdot N}{L}$ | 36 bit |
| Selected sub-bands with P = K' | K' · N | $\left\lceil \log_2\binom{K}{K'} \right\rceil$ | $\left\lceil \log_2\binom{K}{K'} \right\rceil + K' \cdot N$ | 26 bit |
| Selected sub-bands with a single precoding matrix index, P = 1. (Example (b) in FIG. 2.) | N | $\left\lceil \log_2\binom{K}{K'} \right\rceil$ | $\left\lceil \log_2\binom{K}{K'} \right\rceil + N$ | 17 bit |

A computer simulation was also carried out to compare the performance of using the full feedback and the feedback of selected bands with a single precoding matrix index (example (b) in FIG. 3).

The results can be seen in Table 2. The throughput loss is within a few percent while the feedback is reduced by

[2] PCT/CN/2006/0004, *Method for sub-band indicator signalling*, Huawei, Patent application, March 2006.

[3] J. Choi, R. W. Heath Jr., *Interpolation Based Unitary Precoding for Spatial Multiplexing MIMO-OFDM with Limited Feedback*, IEEE Globecom Conference 2004, Dallas, USA, November 2004, page 214-218

[4] J. Choi, R. W. Heath Jr., *Interpolation Based Transmit Beamforming for MIMO-OFDM with Limited Feedback*, IEEE Transactions on Signal Processing, Vol. 53, No. 11, November 2005, page 4125-4135.

[5] B. Mondahl, R. W. Heath Jr., *Algorithms for Quantized Precoding in MIMO OFDM Beamforming Systems*, Proceedings of the SPIE, Volume 5847, pp. 80-87 (2005).

[6] 3GPP R1-061441, *Feedback Reduction for Rank-1 precoding for E-UTRA downlink*, Texas Instruments, Shanghai, May 2006.

[7] 3GPP R1-061439, *Evaluation of Codebook-based Precoding for LTE MIMO Systems*, Texas Instruments, Shanghai, May 2006.

[8] 3GPP R1-031303, *System-level evaluation of OFDM—initial evaluation*, Ericsson, Nov. 17-21, 2003.

What is claimed is:

1. A method for reducing an amount of precoding feedback information in a multi-carrier Multiple-Input Multiple-Output (MIMO) communication system, wherein the system being arranged for carrying information on a number of streams Ns using multiple sub-carriers being grouped together into a set $\Omega$ of K allowed sub-bands $(n_1, \ldots, n_K)$, the method comprising:

jointly selecting, while considering transmission quality for each relevant combination of sub-bands and matrices, a limited number of P codebook indices and a limited number of K' sub-bands to be included in a subset $\omega$ $(m_1, \ldots, m_{K'})$ of the set $\Omega$, wherein K' is set to a value K'<K and P is set to a value P$\leq$K', and conveying the P codebook indices and information identifying the subset $\omega$ to a transmitting end.

2. The method according to claim 1, wherein the P codebook indices are included in a vector $\Pi$.

3. The method according to claim 2, wherein the selections of codebook indices and corresponding sub-bands to be used for the subset $\omega$ are performed such that a transmission quality function is maximized.

4. The method according to claim 3, wherein the subset $\omega$ $(m_1, \ldots, m_{K'})$ and the P codebook indices in vector $\Pi$ fulfill:

$$\{\Pi, \omega\} = \arg\max_{\hat{\Pi},\hat{\omega}} f(\hat{\Pi}, \hat{\omega}, N_S),$$

wherein $\Pi$ is a vector containing P precoding matrix indices corresponding to the sub-bands or groups of sub-bands in the subset of sub-bands $\omega$, $f$ is a scalar transmission quality function that takes the quality of transmission over multiple stream and multiple sub-band measures into consideration, K' is a given number defining the number of sub-bands for which codebook indices are to be conveyed, K'<K, and $N_S$ is a given number of streams.

5. The method according to claim 2, wherein codebook indices, sub-bands to be used for the subset $\omega$ and a number of streams are jointly selected with respect to a transmission quality function.

6. The method according to claim 5, wherein codebook indices and sub-bands to be used for the subset $\omega$ and a number of streams Ns are jointly selected such that the transmission quality function is maximized.

7. The method as claimed claim 6, wherein the subset $\omega$ $(m_1, \ldots, m_{K'})$, the P codebook indices in vector $\Pi$ and the number of streams Ns fulfill:

$$\{\Pi, \omega, N_S\} = \arg\max_{\hat{\Pi},\hat{\omega},\hat{N}_S} f(\hat{\Pi}, \hat{\omega}, \hat{N}_S),$$

wherein $\Pi$ is a vector containing P precoding matrix indices corresponding to the sub-bands or groups of sub-bands in the subset of sub-bands $\omega$, $f$ is a scalar transmission quality function that takes the quality of transmission over multiple stream and multiple sub-band measures into consideration, K' is a given number defining the number of sub-bands for which codebook indices are to be conveyed, K'<K, and $N_S$ is a number of streams.

8. The method according to claim 4, wherein the function $f$ is defined as:

$f(\Pi,\omega,N_S)$=min(EESM$_1(\Pi,\omega,N_S)$, $\Lambda$, EESM$_{N_S}(\Pi,\omega,N_S)$), wherein $\Pi$ is a vector containing P precoding matrix indices corresponding to the sub-bands or groups of sub-bands in the subset of sub-bands $\omega$, Ns is a number of streams, and EESM is an effective exponential SIR mapping function.

9. The method according to claim 4, wherein the function $f$ is defined as:

$$f(\Pi, \omega, N_S) = \sum_{i=1}^{N_S} \log_2(1 + EESM_i(\Pi, \omega, N_S)),$$

wherein $\Pi$ is a vector containing P precoding matrix indices corresponding to the sub-bands or groups of sub-bands in the subset of sub-bands $\omega$, Ns is a number of streams, and EESM is an effective exponential SIR mapping function.

10. The method according to claim 4, wherein the function $f$ is defined as:

$$f(\Pi, \omega, N_S) = \sum_{i=1}^{N_S} g_{BLER}(EESM_i(\Pi, \omega, N_S)),$$

wherein $\Pi$ is a vector containing P precoding matrix indices corresponding to the sub-bands or groups of sub-bands in the subset of sub-bands $\omega$, $N_S$ is a number of streams, EESM is an effective exponential SIR mapping function, and $g_{BLER}(x)$ is a function which maps EESM values to a corresponding largest possible code block size (number of information bits) which gives BLER less than a prescribed desired value.

11. The method according to claim 4, wherein the function $f$ is defined as:

$f(\Pi,\omega,N_s)$=EESM$_{1,\ldots,N_s}(\Pi,\omega,N_S)$, wherein $\Pi$ is a vector containing P precoding matrix indices corresponding to the sub-bands or groups of sub-bands in the subset of sub-bands $\omega$, $N_S$, is a number of streams, and EESM is an effective exponential SIR mapping function.

12. The method according to claim 1, wherein the transmitting end is a BTS/Node B and a corresponding receiving end is a mobile station/UE, or the transmitting end is a mobile station/UE and a corresponding receiving end is a BTS/node B.

13. The method according to claim 12, if the transmitting end is a BTS/Node B and the receiving end is a mobile station/UE, wherein the number of sub-bands K' for which codebook indices are to be conveyed is set by one of (1) a BTS/Node B and (2) a mobile station/UE.

14. The method according to claim 1, wherein the number of codebook indices P is one, P=1, or the number of codebook indices P is set to a predetermined value, preferably given in a system standard.

15. The method according to claim 1, wherein a precoding matrix index for a complementary set $\bar{\omega}$ is conveyed to the transmitted end in addition to the P precoding matrix indices for the subset $\omega$, wherein $\bar{\omega} Y \omega = \Omega$ and $\Omega$ is the total set of allowed sub-bands.

16. The method according to claim 1, wherein a precoding matrix index for a complementary set $\bar{\omega}$ is fixed, wherein $\bar{\omega} Y \omega = \Omega$ and $\Omega$ is the total set of allowed sub-bands.

17. The method according to claim 16, wherein the fixed precoding matrix includes one of (1) an identity matrix and (2) selected columns from an identity matrix.

18. The method according to claim 1, wherein the information identifying the subset is included in a bitmap representation.

19. A method for reducing an amount of precoding feedback information in a multi-carrier Multiple-Input Multiple-Output (MIMO) communication system, wherein information is carried on a number of streams Ns using multiple sub-carriers being grouped together into a set $\Omega$ of K allowed sub-bands $(n_1, \ldots, n_K)$, characterized by comprising:

selecting, at a transmitting end, a suitable precoding matrix to be used from a precoding codebook based on codebook indices fed back from a receiving end, receiving information identifying a limited number of K' sub-bands in a subset $\omega(m_1, \ldots, m_{K'})$ of the set $\Omega$ and a limited number of P codebook indices to be used for the K' sub-bands in the subset $\omega$, the information and the P codebook indices being jointly selected, while considering transmission quality for each relevant combination of sub-bands and matrices, and being fed back from the receiving end, and transmitting on the K' sub-bands using the P codebook indices.

20. A receiving unit arranged for reducing an amount of precoding feedback information in a multi-carrier Multiple-Input Multiple-Output (MIMO) communication system, the system being arranged for carrying information on a number of streams Ns using multiple sub-carriers being grouped together into a set $\Omega$ of K allowed sub-bands $(n_1, \ldots, n_K)$, characterized in that the receiving unit comprises:

means for jointly selecting, while considering transmission quality for each relevant combination of sub-bands and matrices, a limited number of P codebook indices and a limited number of K' sub-bands to be included in a subset $\omega (m_1, \ldots, m_{K'})$ of the set $\Omega$, wherein K' is set to a value K'<K and P is set to a value P≤K', and means for conveying the P codebook indices and information identifying the subset $\omega$ to a corresponding transmitting unit.

21. The receiving unit according to claim 20, wherein the receiving unit is (1) a mobile station/UE.

22. The method according to claim 7, wherein the function $f$ is defined as:

$f(\Pi, \omega, N_S) = \min(EESM_1(\Pi, \omega, N_S), \Lambda, EESM_{N_S}(\Pi, \omega, N_S))$, wherein $\Pi$ is a vector containing P precoding matrix indices corresponding to the sub-bands or groups of sub-bands in the subset of sub-bands $\omega$, Ns is a number of streams, and EESM is an effective exponential SIR mapping function.

23. The method according to claim 7, wherein the function $f$ is defined as:

$$f(\Pi, \omega, N_S) = \sum_{i=1}^{N_S} \log_2(1 + EESM_i(\Pi, \omega, N_S)),$$

wherein $\Pi$ is a vector containing P precoding matrix indices corresponding to the sub-bands or groups of sub-bands in the subset of sub-bands $\omega$, Ns is a number of streams, and EESM is an effective exponential SIR mapping function.

24. The method according to claim 7, wherein the function $f$ is defined as:

$$f(\Pi, \omega, N_S) = \sum_{i=1}^{N_S} g_{BLER}(EESM_i(\Pi, \omega, N_S)),$$

wherein $\Pi$ is a vector containing P precoding matrix indices corresponding to the sub-bands or groups of sub-bands in the subset of sub-bands $\omega$, $N_S$, is a number of streams, EESM is an effective exponential SIR mapping function, and $g_{BLER}(x)$ is a function which maps EESM values to a corresponding largest possible code block size (number of information bits) which gives BLER less than a prescribed desired value.

25. The method according to claim 7, wherein the function $f$ is defined as:

$f(\Pi, \omega, N_s) = EESM_{1, \ldots, N_S}(\Pi, \omega, N_s)$, wherein $\Pi$ is a vector containing P precoding matrix indices corresponding to the sub-bands or groups of sub-bands in the subset of sub-bands $\omega$, $N_S$ is a number of streams, and EESM is an effective exponential SIR mapping function.

26. The receiving unit according to claim 20, wherein the receiving unit is (2) a BTS/Node B.

27. The method according to claim 1, comprising:

selecting, at the transmitting end, a suitable precoding matrix to be used from a precoding codebook based on codebook indices fed back from a corresponding receiving end.

28. The receiving unit according to claim 20, wherein the system further being arranged for selecting, at the transmitting unit, a suitable precoding matrix to be used from a precoding codebook based on codebook indices fed back from the receiving unit.

29. A multi-carrier MIMO (Multiple Input Multiple Output) communication system comprising a transmitting unit in communication with a receiving unit, the transmitting unit being configured to perform a method for reducing an amount of precoding feedback information in the system, wherein information is carried on a number of streams Ns using multiple sub-carriers being grouped together into a set $\Omega$ of K allowed sub-bands $(n_1, \ldots, n_K)$, the method comprising:

selecting, at the transmitting end, a suitable precoding matrix to be used from a precoding codebook based on codebook indices fed back from the receiving end, receiving information identifying a limited number of K' sub-bands in a subset $\omega$ $(m_1, \ldots, m_{K'})$ of the set $\Omega$ and a limited number of P codebook indices to be used for the K' sub-bands in the subset $\omega$, the information and the P codebook indices being jointly selected, while considering transmission quality for each relevant combination of sub-bands and matrices, and being fed back from the receiving end, and transmitting on the K' sub-bands using the P codebook indices.

30. At least one processor configured to perform a method for reducing an amount of precoding feedback information in a multi-carrier MIMO (Multiple Input Multiple Output) communication system, wherein said system carrying information on a number of streams Ns using multiple sub-carriers being grouped together into a set $\Omega$ of K allowed sub-bands $(n_1, \ldots, n_K)$, the method comprising:

jointly selecting, while considering transmission quality for each relevant combination of sub-bands and matrices, a limited number of P codebook indices and a limited number of K' sub-bands to be included in a subset $\omega$ $(m_1, \ldots, m_{K'})$ of the set $\Omega$, wherein K' is set to a value K'<K and P is set to a value $P \leq K'$, and conveying the P codebook indices and information identifying the subset $\omega$ to a transmitting end.

31. At least one processor configured to perform a method for reducing an amount of precoding feedback information in a multi-carrier MIMO (Multiple Input Multiple Output) communication system, wherein information is carried on a number of streams Ns using multiple sub-carriers being grouped together into a set $\Omega$ of K allowed sub-bands $(n_1, \ldots, n_K)$, the method comprising:

selecting, at a transmitting end, a suitable precoding matrix to be used from a precoding codebook based on codebook indices fed back from a receiving end, receiving information identifying a limited number of K' sub-bands in a subset $\omega$ $(m_1, \ldots, m_{K'})$ of the set $\Omega$ and a limited number of P codebook indices to be used for the K' sub-bands in the subset $\omega$, the information and the P codebook indices being jointly selected, while considering transmission quality for each relevant combination of sub-bands and matrices, and being fed back from the receiving end, and transmitting on the K' sub-bands using the P codebook indices.

\* \* \* \* \*